(12) United States Patent
Kmit et al.

(10) Patent No.: US 10,788,629 B2
(45) Date of Patent: Sep. 29, 2020

(54) PASSIVE DISTRIBUTION SYSTEM USING FIBER INDEXING

(71) Applicant: CommScope Technologies LLC, Hickory, NC (US)

(72) Inventors: Paul Kmit, Broomfield, CO (US); Thomas Parsons, Leominster, MA (US); Erik J. Gronvall, Bloomington, MN (US); Douglas C. Ellens, Buffalo, MN (US); Panayiotis Toundas, Vancouver (CA); Timothy G. Badar, Redwood City, CA (US); Trevor D. Smith, Eden Prairie, MN (US); Thomas G. LeBlanc, Westminster, MA (US); Todd Loeffelholz, Bellingham, WA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/837,571

(22) Filed: Dec. 11, 2017

(65) Prior Publication Data
US 2018/0164514 A1    Jun. 14, 2018

Related U.S. Application Data

(63) Continuation of application No. 15/161,827, filed on May 23, 2016, now Pat. No. 9,841,569, which is a
(Continued)

(51) Int. Cl.
*G02B 6/38* (2006.01)
*G02B 6/42* (2006.01)
(Continued)

(52) U.S. Cl.
CPC ......... *G02B 6/3895* (2013.01); *G02B 6/3849* (2013.01); *G02B 6/3885* (2013.01);
(Continued)

(58) Field of Classification Search
CPC .. G02B 6/3895; G02B 6/3849; G02B 6/4285; G02B 6/4457; G02B 6/3885;
(Continued)

(56) References Cited

U.S. PATENT DOCUMENTS 6,351,582 B1    2/2002  Dyke et al.
7,266,274 B2 *  9/2007  Elkins, II ............. G02B 6/4473
                                                    385/100
(Continued)

FOREIGN PATENT DOCUMENTS

FR    2 914 753 A1    10/2008
JP    10-32545 A       2/1998
(Continued)

OTHER PUBLICATIONS

European Search Report for Application No. 13767640.9 dated Oct. 21, 2015.
(Continued)

*Primary Examiner* — Ryan A Lepisto
(74) *Attorney, Agent, or Firm* — Merchant & Gould P.C.

(57) ABSTRACT

The present disclosure relates to systems and method for deploying a fiber optic network. Distribution devices are used to index fibers within the system to ensure that live fibers are provided at output locations throughout the system. In an example, fibers can be indexed in multiple directions within the system. In an example, fibers can be stored and deployed form storage spools.

13 Claims, 22 Drawing Sheets

Related U.S. Application Data continuation of application No. 14/285,949, filed on May 23, 2014, now Pat. No. 9,348,096, which is a continuation-in-part of application No. PCT/US2013/034618, filed on Mar. 29, 2013.

(60) Provisional application No. 61/618,156, filed on Mar. 30, 2012, provisional application No. 61/826,655, filed on May 23, 2013, provisional application No. 61/971,390, filed on Mar. 27, 2014.

(51) Int. Cl.
  *G02B 6/44* (2006.01)
  *H04B 10/25* (2013.01)
  *H04J 14/02* (2006.01)
  *H04Q 11/00* (2006.01)
  *H04B 10/27* (2013.01)

(52) U.S. Cl.
  CPC ......... *G02B 6/4285* (2013.01); *G02B 6/4457* (2013.01); *H04B 10/25* (2013.01); *H04B 10/27* (2013.01); *H04J 14/0205* (2013.01); *H04Q 11/0067* (2013.01); *G02B 6/4472* (2013.01); *G02B 6/4475* (2013.01); *H04Q 2011/0073* (2013.01); *H04Q 2011/0077* (2013.01)

(58) Field of Classification Search
  CPC .... G02B 6/4475; G02B 6/4472; H04B 10/25; H04B 10/27; H04J 14/0205; H04Q 11/0067; H04Q 2011/0077; H04Q 2011/0073
  See application file for complete search history.

(56) References Cited

U.S. PATENT DOCUMENTS

| | | |
|---|---|---|
| 7,668,425 B1 | 2/2010 | Elkins, II et al. |
| 8,249,450 B2 | 8/2012 | Conner |
| 9,348,096 B2 | 5/2016 | Kmit et al. |
| 9,841,569 B2 | 12/2017 | Kmit et al. |
| 2006/0233506 A1 | 10/2006 | Noonan et al. |
| 2006/0269208 A1 | 11/2006 | Allen et al. |
| 2009/0041457 A1 | 2/2009 | Maki et al. |
| 2009/0317047 A1 | 12/2009 | Smith et al. |
| 2010/0092129 A1* | 4/2010 | Conner ................ G02B 6/4452 385/17 |
| 2010/0092133 A1 | 4/2010 | Conner |
| 2010/0092146 A1 | 4/2010 | Conner et al. |
| 2010/0092169 A1 | 4/2010 | Conner et al. |
| 2010/0142888 A1 | 6/2010 | Graff et al. |
| 2011/0058785 A1 | 3/2011 | Solheid et al. |
| 2011/0097052 A1 | 4/2011 | Solheid et al. |
| 2011/0293277 A1* | 12/2011 | Bradea ................ G02B 6/445 398/66 |
| 2012/0027355 A1* | 2/2012 | LeBlanc .............. G02B 6/4471 385/54 |
| 2012/0321309 A1 | 12/2012 | Barry et al. |
| 2014/0226939 A1 | 8/2014 | Boxer et al. |

FOREIGN PATENT DOCUMENTS

| | | |
|---|---|---|
| JP | 2009-38650 A | 2/2009 |
| KR | 10-2009-0114191 A | 11/2009 |
| WO | 2008/079329 A2 | 7/2008 |
| WO | 2010/093794 A1 | 8/2010 |
| WO | 2011/130472 A2 | 10/2011 |

OTHER PUBLICATIONS

International Search Report for International Application No. PCT/US2013/034618 dated Jul. 26, 2013 (3 pages).
International Search Report and Written Opinion for PCT/US2014/039377 dated Oct. 22, 2014.
Extended European Search Report for Application No. 14800905.3 dated Dec. 22, 2016.
Partial European Search Report for Application No. 18213889.1 dated Mar. 29, 2019.
Extended European Search Report for Application No. 18213889.1 dated Jul. 1, 2019.

* cited by examiner

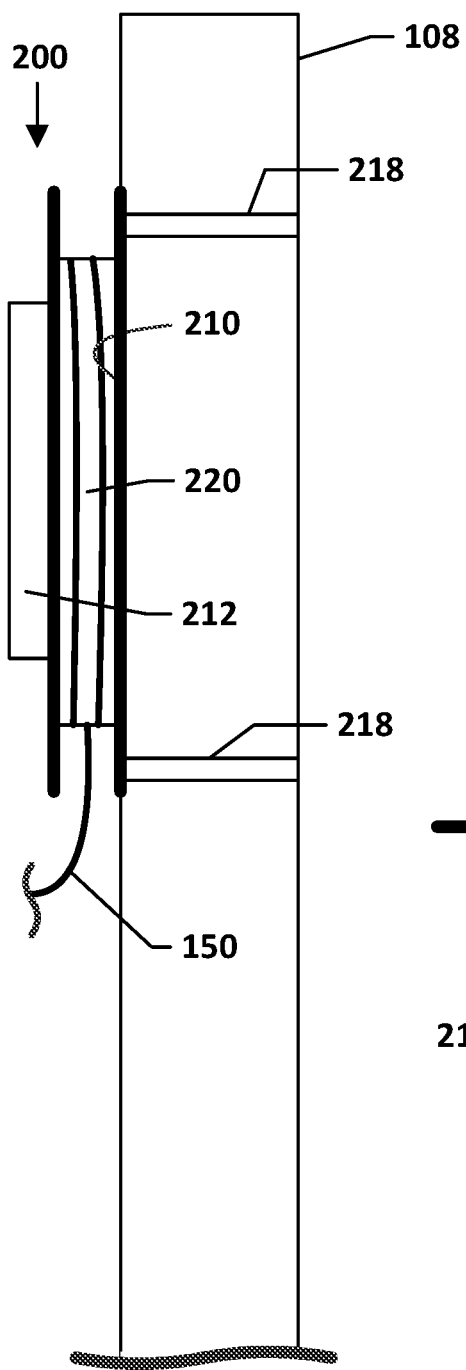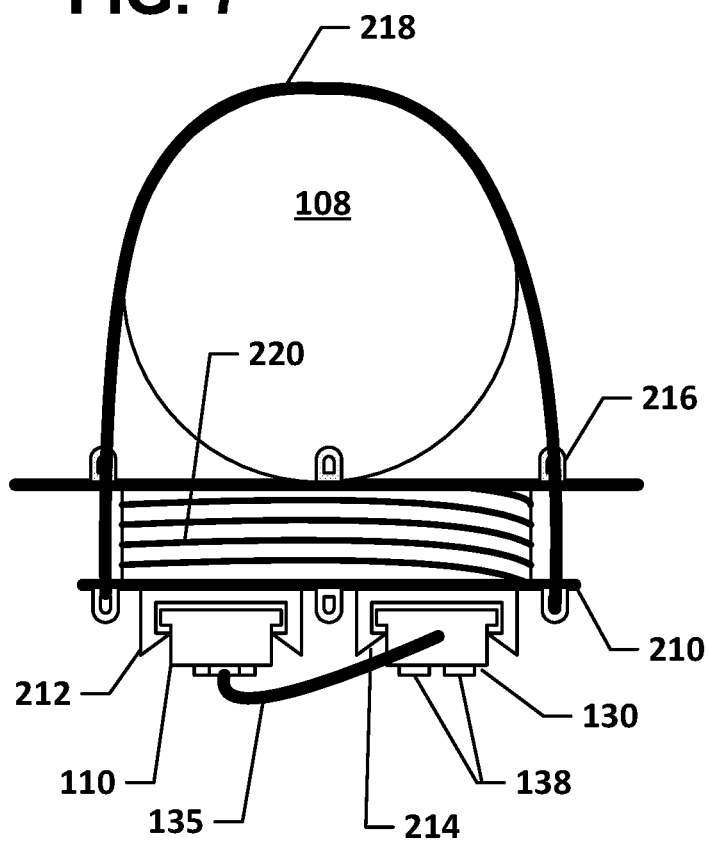

PASSIVE DISTRIBUTION SYSTEM USING FIBER INDEXING

CROSS REFERENCE FOR RELATED APPLICATIONS

This application is a Continuation of U.S. application Ser. No. 15/161,827, filed May 23, 2016, now U.S. Pat. No. 9,841,569, which is a Continuation of U.S. application Ser. No. 14/285,949, filed May 23, 2014, now U.S. Pat. No. 9,348,096, which is a Continuation-In-Part of International Application No. PCT/US2013/034618, filed Mar. 29, 2013, which claims benefit of U.S. Provisional Ser. No. 61/618, 156, filed Mar. 30, 2012, the disclosures of which are hereby incorporated herein by reference. This application also claims benefit of U.S. Provisional Ser. No. 61/826,655, filed May 23, 2013 and U.S. Provisional Ser. No. 61/971,390, filed Mar. 27, 2014, the disclosures of which are hereby incorporated herein by reference. To the extent appropriate, a claim of priority is made to each of the above referenced applications.

TECHNICAL FIELD

The present disclosure relates generally to equipment for fiber optic communications networks. More particularly, the present disclosure relates to the components of passive optical networks and methods for deploying the same.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Aspects of the disclosure relate to a fiber optic network architecture including multiple fiber optic lines routed at least partially along a route that extends past multiple drop locations; and a plurality of multi-fiber optical connectors positioned along the route. The fiber optic lines extend through the multi-fiber optical connectors. The multi-fiber optical connectors each have multiple consecutive fiber positions for receiving optical fibers corresponding to the fiber optic lines. The fiber optic lines include first fiber lines that are indexed in a first indexing direction along the consecutive fiber positions of the multi-fiber optical connectors as the first fiber optic lines extend in a first route direction along the route. The first fiber optic lines are progressively dropped from the route to subscriber connection points at the drop locations by progressively indexing the first fiber optic lines to one of the consecutive fiber positions that are a first predetermined drop position. The fiber optic lines include second fiber lines that are indexed in a second indexing direction along the consecutive fiber positions as the second fiber optic lines extend in a second route direction along the route. The second fiber optic lines are progressively dropped from the route to subscriber connection points at the drop locations by progressively indexing the second fiber optic lines to another of the consecutive fiber positions that is a second predetermined drop position. The second predetermined drop position is a different one of the consecutive fiber positions as compared to the first predetermined drop position. The first indexing direction is opposite from second indexing direction. The first route direction is opposite form the second route direction.

Other aspects of the disclosure related to a fiber optic network architecture including multiple fiber optic lines routed at least partially along a route that extends past multiple drop locations; and a plurality of multi-fiber optical connectors positioned along the route. The fiber optic lines extend through the multi-fiber optical connectors. The multi-fiber optical connectors each have a plurality of consecutive fiber positions for receiving optical fibers corresponding to the fiber optic lines. The fiber optic lines include first fiber lines that are indexed in a first indexing direction along the consecutive fiber positions of the multi-fiber optical connectors as the first fiber optic lines extend in a first route direction along the route. The first fiber optic lines are progressively indexed toward one of the consecutive fiber positions, which is a first predetermined drop position. The fiber optic lines also include second fiber lines that are indexed in a second indexing direction along the consecutive fiber positions as the second fiber optic lines extend in a second route direction along the route. The second fiber optic lines are progressively indexed toward another of the consecutive fiber positions, which is a second predetermined drop position. The second predetermined drop position is a different one of the consecutive fiber positions as compared to the first predetermined drop position. The first indexing direction is opposite from the second indexing direction. The first route direction is opposite from the second route direction. At least some of the first predetermined drop positions and at least some of the second predetermined drop positions are coupled to subscriber locations.

Other aspects of the disclosure related to an optical fiber cable assembly including a first multi-fiber connector having a plurality of first fiber apertures disposed in a layout; a second multi-fiber connector having a plurality of second fiber apertures disposed in the layout so that each second fiber aperture corresponds to one of the first fiber apertures in the layout; optical fibers extending from the first multi-fiber connector to the second multi-fiber connector; and an output fiber extending from a first end to a second end. Each of the optical fibers has a first end that is located at one of the first fiber apertures and a second end that is located at one of the second fiber apertures. The respective first fiber aperture of each optical fiber does not correspond to the respective second fiber aperture of the optical fiber in the layout. The first end of the output fiber is located at one of the first fiber apertures. The second end of the output fiber is separate from the second multi-fiber connector. The cable assembly does not include a rigid housing.

Other aspects of the disclosure related to an optical fiber cable assembly including indexed optical fibers extending from a first multi-fiber connector to a second multi-fiber connector; an output fiber; a flexible closure disposed over the indexed optical fibers and the output fiber; and a first stub cable terminated by the first multi-fiber connector, the first stub cable being stored on a rapid spool prior to deployment. Each of the multi-fiber connectors has a common indexing sequence. The output fiber extends from the first position in the indexing sequence at the first multi-fiber connector to a third connector. An optical fiber having a second position in the indexing sequence at the first multi-fiber connector is routed to a first position in the indexing sequence of the second multi-fiber connector.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 6 is a side elevational view of a mounting bracket mounted to a pole after the stub distribution cable is paid out and the payout spool is removed in accordance with the principles of the present disclosure;

FIG. 7 is a top plan view of the mounting bracket and pole of FIG. 6;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
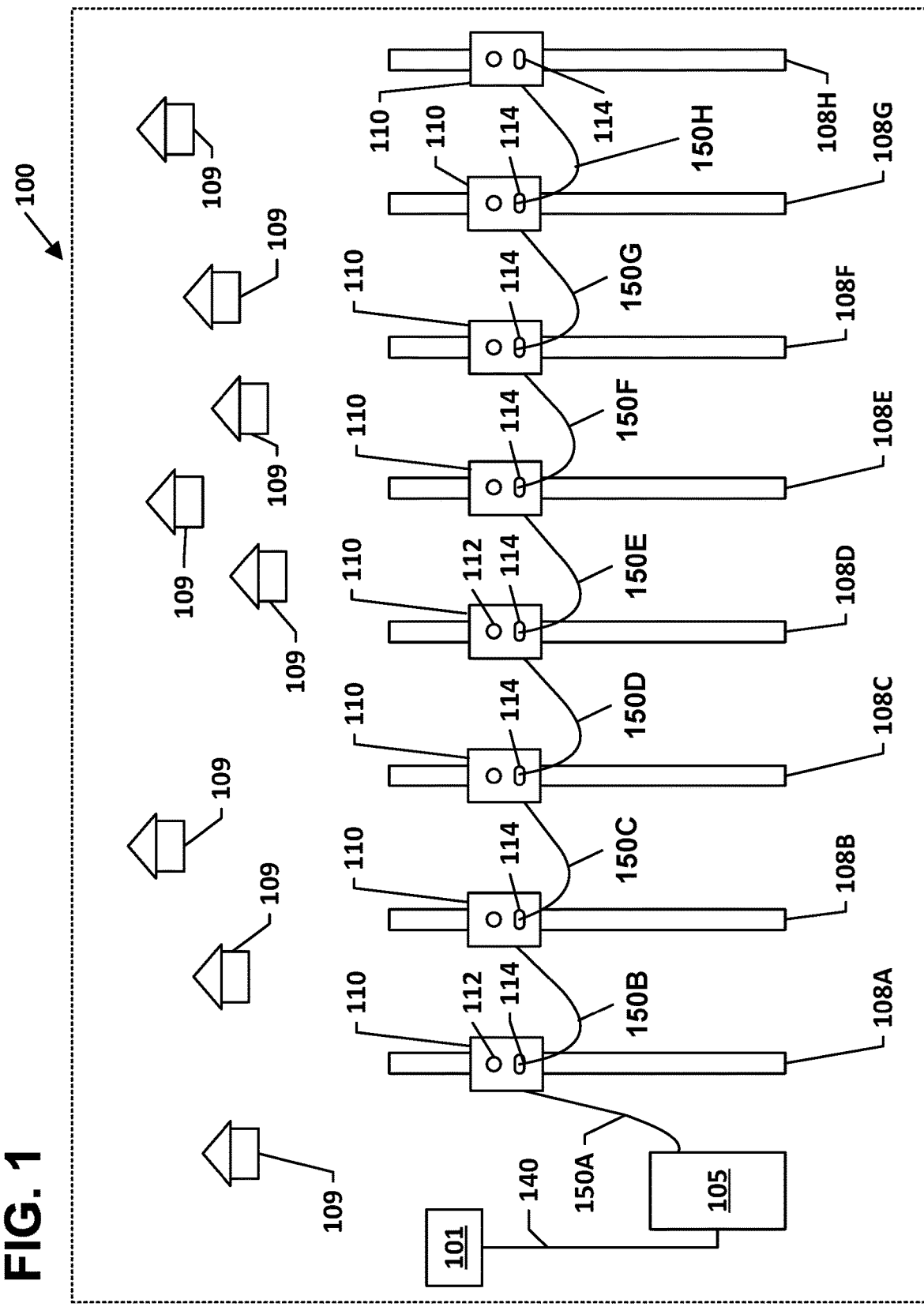
FIG. 1 is a schematic diagram of an example distributed optical network including indexing terminals daisy-chained together.

FIG. 1 illustrates an example optical network 100 being deployed in accordance with the principles of the present disclosure. The example optical network 100 includes a central office 101 and at least one fiber distribution hub 105. While only a single hub 105 is shown in FIG. 1, it will be understood that optical networks 100 typically include multiple hubs. At least one feeder cable 140 extends from the central office 101 to each distribution hub 105. At the distribution hub 105, optical fiber carried by the feeder cable 140 are split onto optical fibers of one or more distribution cables 150. At least one distribution cable 150 extends from the distribution hub 105 towards subscriber premises 109.

In accordance with some aspects, the optical network 100 is a distributed optical network in which optical signals may be split at a splitting location disposed between the distribution hub 105 and the individual subscriber premises 109 as will be disclosed in more detail herein. In such systems, individual optical fibers may be broken out from the distribution cable 150 at geographic intervals and routed to the splitting locations. In various implementations, the splitting locations may be positioned at telephone poles, strands, and/or hand holes. From the splitting locations, the split optical signals are carried by drop cables to the individual subscriber premises 109.

In some implementations, the individual optical fibers are broken out from the distribution cable 150 at indexing terminals 110. Each indexing terminal 110 receives a distribution cable 150 having two or more optical fibers. In some implementations, the distribution cable 150 is a stub cable that extends outwardly from the indexing terminal 110. In other implementations, the indexing terminal 110 receives a connectorized end of the distribution cable 150. In certain implementations, each indexing terminal 110 separates one of the optical fibers from the other optical fibers 152 of the distribution cable 150. The separated optical fiber 152 is routed to a first port 112 of the indexing terminal 110 and the other optical fibers 154 are routed to a second port 114 of the indexing terminal 110 (e.g., see FIG. 2).

In the example shown in FIG. 1, a first distribution cable 150A is routed from the distribution hub 105 to a mounting structure (e.g., telephone pole) 108A at which an indexing terminal 110 is mounted. The indexing terminal 110 has a first port 112 and a second port 114. A second distribution cable 150B extends from the indexing terminal 110 at the first mounting structure 108A to another indexing terminal mounted at a second mounting structure 108B. In the distributed network 100 shown in FIG. 1, indexing terminals 110 are mounted to eight poles 108A-108H. These indexing terminals 110 are daisy-chained together using distribution cables 150A-150H as will be described in more detail herein. In other implementations, however, distributed networks may include a greater or lesser number of indexing terminals 110.

Figure 2:
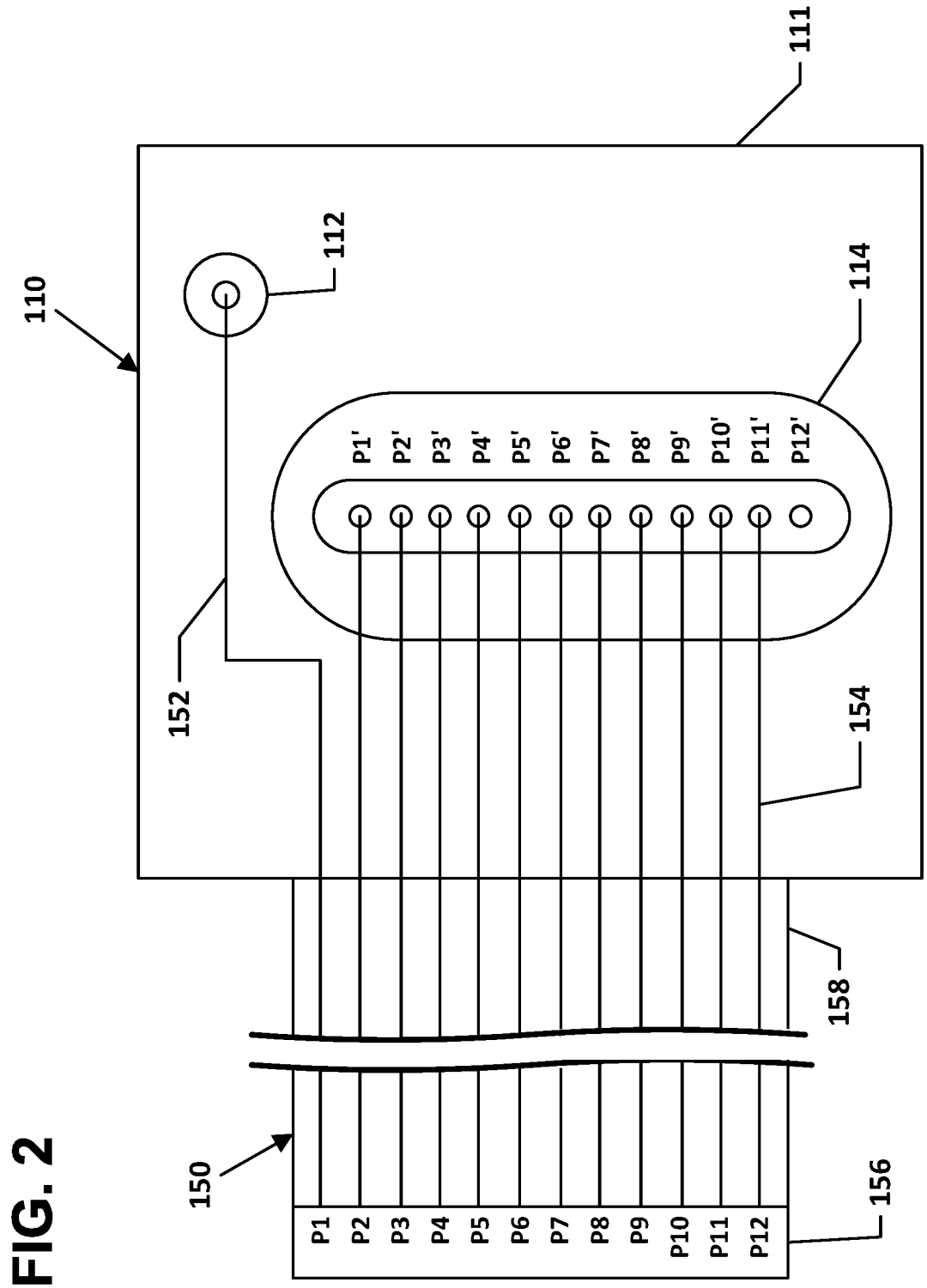
FIG. 2 is a schematic diagram of an example indexing terminal suitable for use in the distributed optical network of FIG. 1.

FIG. 2 illustrates an example indexing terminal 110 suitable for use in the distributed optical network 100 of FIG. 1. The indexing terminal 110 includes a housing 111 that defines the first port 112 and the second port 114. In the example shown, a stub distribution cable 150 extends outwardly from the indexing terminal housing 111. The stub distribution cable 150 includes multiple optical fibers that are connectorized at an end opposite the indexing terminal housing 111. In the example shown, the stub distribution cable 150 includes twelve optical fibers. In other implementations, however, the stub distribution cable 150 may include a greater or lesser number of optical fibers (e.g., four, eight, ten, sixteen, twenty-four, seventy-two, etc.).

In certain implementations, the optical fibers of the stub distribution cable 150 extend from first ends to a second ends. The first ends of the fibers are connectorized at a multi-fiber connector 156 (e.g., an MPO-type connector). In the example shown, the first ends of the fibers are connectorized at a ruggedized multi-fiber connector (e.g., an HMFOC-connector). As the terms are used herein, ruggedized optical connectors and ruggedized optical adapters are configured to mate together to form an environmental seal. Some non-limiting example ruggedized optical connector interfaces suitable for use with an indexing terminal 110 are disclosed in U.S. Pat. Nos. 7,744,288, 7,762,726, 7,744,286, 7,942,590, and 7,959,361, the disclosures of which are hereby incorporated herein by reference.

The connector 156 indexes the first end of each optical fiber at a particular position relative to the other fibers. In the example shown, the connector 156 indexes each of the twelve optical fibers into one of twelve positions P1-P12. The second port 114 has the same number of fiber positions as the connector 156. In the example shown, the second port 114 has twelve fiber positions P1'-P12' that correspond with the fiber positions P1-P12 of the connector 156. However, at least one of the fiber positions at the second port 114 does not receive an optical fiber as will be disclosed in more detail herein.

A first one 152 of the optical fibers has a first end located at the first position P1 of the connector 156. The second end of the first optical fiber 152 is separated out from the rest of the optical fibers 152 within the indexing terminal housing 111 and routed to the first port 112 at which optical signals carried by the first optical fiber 152 may be accessed. In some implementations, the first port 112 defines a female port at which an optical fiber plug may be mated to the first optical fiber 152 as will be described in more detail herein. In certain implementations, the first port 112 includes a ruggedized (i.e., hardened) optical adapter configured to receive a ruggedized optical connector (e.g., an HMFOC).

The remaining optical fibers 154 are routed to the second port 114. At least one of the fiber positions P1'-P12' does not receive an optical fiber 154 since at least one optical fiber 152 is diverted to the first port 112. However, the second port 114 indexes the received optical fibers 154 so that a first position P1' at the second port 114 that corresponds with the first position P1 of the connector does receive one of the optical fibers 154. In accordance with aspects of the disclosure, when the indexing terminals 110 are daisy-chained together as shown in FIG. 1, the optical fiber 152 diverted to the first port 112 will be pulled from the same position P1-P12. Also, the remaining fibers 154 will be cabled so that the corresponding position P1'-P12' at the second port 114 will receive one of the optical fibers 154 if any are available.

In the example shown, the separated optical fiber 152 located at an end of the row/strip of fibers. Accordingly, the optical fibers 154 are cabled within the terminal housing 111 to divert the second end of each optical fiber 154 over one indexed position P1'-P12' compared to the first end. For example, a fiber 154 having a first end at position Pn of the connector 156 would have a second end at position P(n−1)' at the second port 114. In the example shown, the optical fiber 154 having a first end at the second position P2 of the connector 156 will have a second end disposed at the first position P1' of the second port 114. Likewise, the optical fiber 154 having a first end at disposed the third position P3 of the connector 156 will have a second end disposed at the second position P2' of the second port 114. The optical fiber 154 having a first end at the twelfth position P12 of the connector 156 will have a second end disposed at the eleventh position P11' of the second port 114. The twelfth position P12' of the second port 114 will not receive an optical fiber. In other implementations, the optical fiber at any of the positions P1-P12 may be separated out from the rest as long as each indexing terminal separates out a fiber from the same position.

Such a cabling configuration enables the indexing terminals to be daisy-chained together using identical components while always delivering the next fiber in line to the first port 112. For example, in FIG. 1, the stub distribution cable 150B of the second indexing terminal 110 mounted to the second pole 108B may be routed to and plugged into the second port 114 of the first indexing terminal 110 mounted to the first pole 108A. The stub distribution cable 150A of the first indexing terminal 110 may be routed to the distribution hub 105 to receive split optical signals from the feeder cable 140.

Accordingly, the split optical signals carried by the first optical fiber 152 of the first stub distribution cable 150A are routed to the first port 112 of the first indexing terminal 110. The split optical signals carried by the remaining optical fibers 154 of the first stub distribution cable 150A are routed to positions P1'-P11' of the second port 114 of the first indexing terminal 110.

At the second port 114, the second optical fiber 154 of the first stub cable 150A is mated with the first optical fiber 152 of the second stub cable 150B. The first optical fiber 152 of the second stub cable 150B is routed to the first port 112 of the second indexing terminal. Accordingly, the split optical signals carried by the second optical fiber 154 of the first stub cable 150A propagate to the first optical fiber 152 of the second stub cable 150B and are accessible at the second port 114 of the second indexing terminal 110. Likewise, the split optical signals carried by the sixth optical fiber 154 of the first stub cable 150A propagate to the fifth optical fiber 154 of the second stub cable 150B, the fourth optical fiber 154 of the third stub cable 150C, the third optical fiber 154 of the fourth stub cable 150D, the second optical fiber 154 of the fifth stub cable 150E, and the first optical fiber 152 of the sixth stub cable 150F and are accessible at the second port 114 of the sixth indexing terminal 110.

In alternative implementations, the distribution cable 150 is not a stub cable and the indexing terminal housing 111 defines an input port (e.g., an HMFOC port) configured to receive a second connectorized end of the distribution cable 150. In such implementations, internal cabling between the input port and the second port 114 is implemented as described above. Accordingly, the optical fiber coupled to a first position at the input port is routed to the first port 112 and the optical fiber coupled to a second position at the input port is routed to a first position at the second port 114. In such implementations, each distribution cables 150 would include twelve optical fibers that are connectorized at both ends. The first end of each distribution cable 150 would mate with the input port of one indexing terminal. The second end of each distribution cable 150 would mate with the second port 114 of another indexing terminal.

Figure 3:
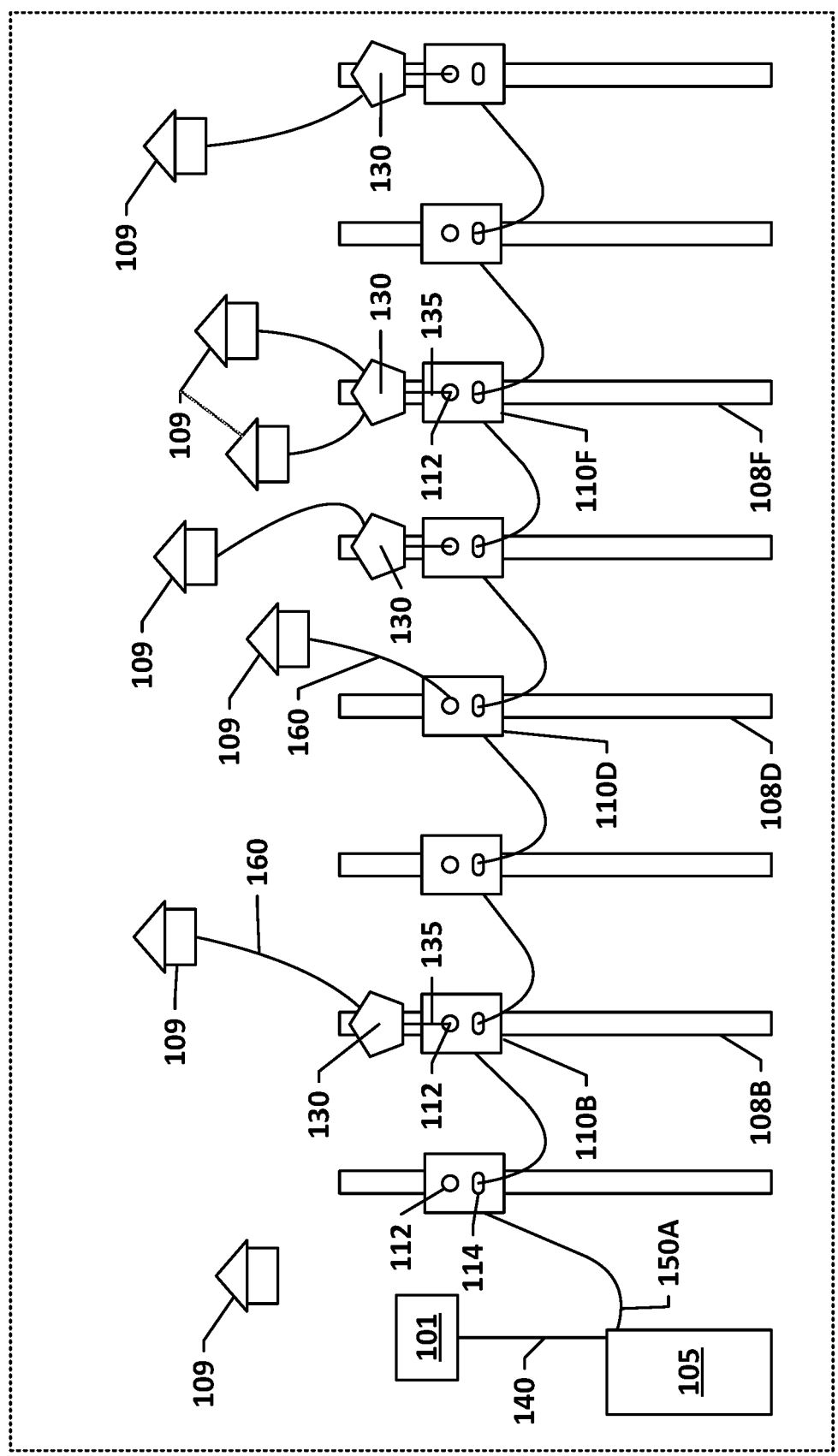
FIG. 3 is a schematic diagram of the example distributed optical network of FIG. 1 in which a number of multi-service terminals have been deployed to connect subscribers to the network.

As shown in FIG. 3, subscribers 109 may be coupled to the optical network 100 via the first ports 112 of the indexing terminals 110. For example, in some implementations, multi-service terminals 130 may be mounted at or near the indexing terminals 110. The multi-service terminal 130 include one or more optical power splitters and/or wave division multiplexers. Splitter pigtails are routed to distribution ports 138 on the multi-service terminal 130. Drop cables 160 may be routed between the distribution ports and the subscriber premises 109. Additional details regarding examples of suitable multi-service terminals can be found in U.S. Pat. No. 7,444,056 and in U.S. Publication No. 2009/0208177, the disclosures of which are hereby incorporated herein by reference.

A cable 135 optically couples one of the multi-service terminals 130 to one of the indexing terminals 110. In some implementations, the cable 135 is a stub cable that extends from the multi-service terminal. For example, a connectorized end of the stub cable 135 may be plugged into the first port 112 of the indexing terminal 110 so that optical signals provided at the first port 112 are routed to the optical splitters and/or wave division multiplexers. In other implementations, the cable 135 is connectorized at both ends and plugs into the first port 112 of the indexing terminal 110 and an input port of the multi-service terminal 130. In still other implementations, the cable 135 is a stub cable extending from the indexing terminal that defines the single-fiber port 112 at a distal end that plugs into an input port of the multi-service terminal 130.

In the example shown in FIG. 3, the distributed optical network includes indexing terminals 110 mounted to eight poles 108A-108H and daisy-chained together via the distribution cables 150A-150H as described above. A first subscriber 109 is coupled to the optical network 100 via a multi-service terminal 130 mounted at the second pole 108B. In particular, a drop cable 160 extends between the subscriber 109 and the multi-service terminal 130. A subscriber cable 135 extends between the multi-service terminal 130 and the first port 112 of the indexing terminal 110. Accordingly, the subscriber 109 receives optical signals that are carried from the distribution hub 105, over the second optical fiber 154 of the first distribution cable 150A, over the first optical fiber 152 of the second distribution cable 150B, to the second port 114 of the second indexing terminal 110B.

As shown at the sixth pole 108F of FIG. 3, optical signals from the single optical fiber 152 received at the first port 112 of the indexing terminal 110 may be carried to the multi-service terminal 130 via cable 135. At the multi-service terminal 130, the optical signals may be split onto two or more (e.g., four, eight, ten, twelve, sixteen, twenty-four, etc.) drop cables 160. Also as shown in FIG. 3, in certain implementations, a drop cable 160 may be routed to the subscriber premises 109 directly from the first port 112 of one of the indexing terminals 110 (e.g., see the fourth indexing terminal 110D). Routing the drop cable 160 directly from the indexing terminal 110 would provide a stronger (i.e., unsplit) optical signal to the subscriber 109.

In still other implementations, one or more optical splitters or wave division multiplexers may be mounted within the indexing terminal 110. In some such implementations, the indexing terminal may include multiple single-fiber ports to which drop cables 160 may be coupled. In other such implementations, the split signals are routed to optical fibers terminated at a multi-fiber connector that is plugged into the first port 112, which may be optically coupled to an input of a multi-service terminal 130 that may or may not include splitters.

Figure 4:
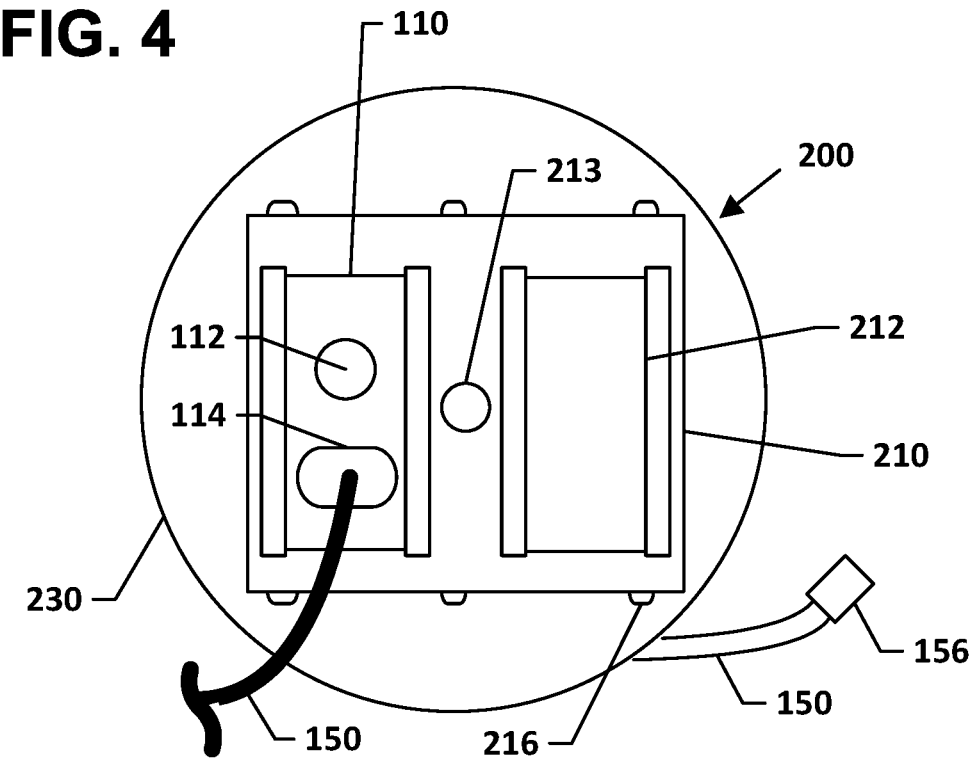
FIG. 4 is a front elevational view of an indexing terminal mounted to an example mounting and payout arrangement including a universal mounting bracket and a payout spool in accordance with the principles of the present disclosure.
Figure 5:
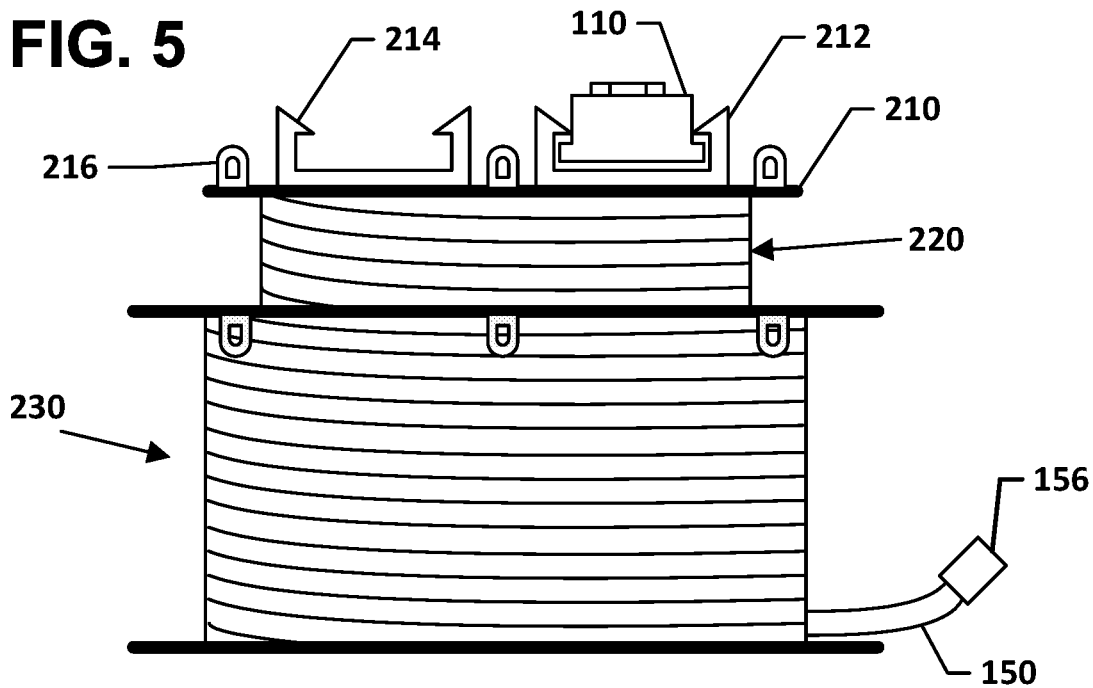
FIG. 5 is a top plan view of the example mounting and payout arrangement of FIG. 4 showing the stub distribution cable of the indexing terminal wrapped around a slack storage spool and the payout spool.

FIGS. 4-5 illustrate one example implementation of a mounting and payout arrangement 200 by which the indexing terminals 110 may be deployed. The mounting and payout arrangement 200 includes a mounting bracket 210 that is configured to secure at least the indexing terminal 110 to a telephone pole 108 or other mounting structure. The mounting bracket 210 includes at least one fastening arrangement 212 at which the indexing terminal 110 may be secured. In the example shown, the fastening arrangement 212 includes a sleeve having latching sides. In some implementations, the indexing terminal 110 may be snap-fit into the sleeve of the fastening arrangement 212. In other implementations, the indexing terminal 110 may be slid into the sleeve of the fastening arrangement 212 from a top or bottom of the sleeve. In other implementations, the fastening arrangement 212 may otherwise secure the indexing terminal 110 to the bracket 210.

In some implementations, the mounting bracket 210 also includes a second fastening arrangement 214 at which a multi-service terminal 130 may be secured (e.g., see FIG. 7). In the example shown, the second fastening arrangement 214 is the same as the fastening arrangement 212. In other implementations, however, the second fastening arrangement 214 may have a different structure than the fastening arrangement 212. In still other implementations, the indexing terminal 110 and the multi-service terminal 130 may be secured to the mounting bracket 210 using a common fastening arrangement. In still other implementations, the multi-service terminal 130 is configured to be mounted to a separate mounting bracket.

The mounting and payout arrangement 200 also includes a payout spool 230 from which the distribution cable 150 of the indexing terminal 110 may be paid out. In some implementations, the payout spool 230 is removable from the mounting bracket 210 when the distribution cable 150 has been unwound from the payout spool 230 (see FIGS. 6 and 7). Removing the payout spool 230 after deployment reduced the footprint of the arrangement that is mounted to the pole 108 or other mounting structure.

The stub distribution cable 150 of the indexing terminal 110 is initially wound around the payout spool 230. The payout spool 230 facilitates management and storage of the distribution cable 150 prior to deployment. In some implementations, the payout spool 230 is configured to rotate about a drum (e.g., mounted to a vehicle) to facilitate deployment of the cable 150. For example, the drum or spool may be inserted through passage 213 that extends through the payout spool 230 along an axis of rotation. In certain implementations, the mounting bracket 210 and indexing terminal 110 rotate in unison with the payout spool 230. In other implementations, the payout spool 230 rotates relative to the mounting bracket 210.

In certain implementations, the mounting and payout arrangement 200 also includes a slack storage spool 220. The slack storage spool 220 remains coupled to the mounting bracket 210 after the payout spool 230 has been removed. The slack storage spool 220 accommodates any excess length of the distribution cable 150 after the indexing terminal 110 is secured to the mounting structure 108. Accordingly, mounting and payout arrangement 200 may be deployed with standardized cable lengths (e.g., 25 feet, 50 feet, 100 feet, 1,000 feet, 2,000 feet, 3,000 feet, etc.). In some implementations, a first portion of the distribution cable 150 nearer the indexing terminal 110 is wound around the slack storage spool 220 and the remainder of the distribution cable 150 is wound around the payout spool 230. In certain implementations, the slack storage spool 220 has a smaller cross-dimension (e.g., diameter) than the payout spool 230.

FIGS. 6 and 7 illustrate the example mounting bracket 210 securing the indexing terminal 110 to an example telephone pole 108 after the payout spool 230 has been removed. The indexing terminal 110 is held to the mounting bracket 210 by fastening arrangement 212. The mounting bracket 210 is coupled to the slack storage spool 220, which is disposed against the pole 108. In the example shown, the bracket 210 is mounted to the pole 108 using straps 218 that wrap around the pole 108 and couple to hooks 216. In other implementations, the bracket 210 may be otherwise coupled to the pole 108. In the example shown in FIG. 7, a multi-service terminal 130 has been mounted to the bracket 210 using fastening arrangement 214. A stub cable 135 of the multi-service terminal 130 is plugged into the first port 112 of the indexing terminal 110. Ruggedized ports 138 of the multi-service terminal 130 are configured to receive drop cables 160 as needed to add subscribers 109 to the network 100.

The distributed optical fiber network 100 is initially deployed by plugging the connectorized end 156 of a first distribution cable 150A into a termination field at a fiber distribution hub 105 or otherwise coupling the connectorized end 156 to one or more fibers of the feeder cable 140. In certain implementations, the first distribution cable 150A extends from an indexing terminal 110 mounted to a mounting and payout arrangement 200. The distribution cable 150A is paid out from a payout spool 230 of the mounting and payout arrangement 200 as the mounting and payout arrangement 200 is moved from the distribution hub 105 to a first pole 108A. For example, the payout spool 230 may be rotatably mounted to a shaft on a vehicle so that the payout spool 230 unwinds as the vehicle moves. In an alternative implementation, the mounting and payout arrangement 200 is secured to a mounting location and the distribution cable 150 is paid out and routed to the hub 105. In certain implementations, the distribution cable 150A is lashed to a strand between adjacent mounting structures 108 as the cable 150A is paid out.

During payout, the distribution cable 150A also may be unwound from the slack storage spool 220 to the extent necessary as the mounting and payout arrangement 200 is routed to the first pole 108A. The payout spool 230 is removed when the distribution cable 150 has been unwound from the payout spool 230. At the mounting structure 108, the mounting bracket 210 is mounted to the first mounting structure 108A (FIG. 1). In some implementations, the mounting bracket 210 is mounted to the first pole 108A while the indexing terminal 110 is held by the mounting bracket 210. In other implementations, the indexing terminal 110 is secured to the mounting bracket 210 after the mounting bracket 210 is mounted to the first pole 108A. In certain implementations, the mounting bracket 210 is lashed to a strand between adjacent mounting structures 108 (e.g., see FIG. 10).

The connectorized end 156 of a second distribution cable 150B is plugged into the second port 114 of the indexing terminal 110. The second distribution cable 150B extends from an indexing terminal 110 mounted to a second mounting and payout arrangement 200. The distribution cable 150B is paid out from a payout spool 230 of the second mounting and payout arrangement 200 as the mounting and payout arrangement 200 is routed from the first pole 108A to the second pole 108B. The payout spool 230 is removed when the distribution cable 150 has been unwound from the payout spool 230. The second distribution cable 150B also is unwound from the slack storage spool 220 as necessary as the second mounting and payout arrangement 200 is routed to the second pole 108B. The mounting bracket 210 of the second mounting and payout arrangement 200 is mounted to the second pole 108B. Additional indexing terminals 110 are likewise mounted to additional poles (e.g., poles 108B-108H) in the same way.

When a subscriber 109 is to be added to the network 100, a multi-service terminal 130 may be mounted to the pole 108A-108H that is located closest to the subscriber 109 or otherwise corresponds to the subscriber 109. In certain implementations, the multi-service terminal 130 is mounted to the mounting bracket 210 (e.g., via fastening arrangement 214). Mounting both the indexing terminal 110 and the multi-service terminal 130 to the same bracket 210 may reduce the footprint taken up by the mounting and payout arrangement 200. Mounting both the indexing terminal 110 and the multi-service terminal 130 to the same bracket 210 also may reduce the cost of deploying the multi-service terminal (e.g., by facilitating installation at the pole 108). A connectorized end of a stub cable 135 of the multi-service terminal 130 is plugged into the first port 112 of the indexing terminal 110, thereby providing optical signals from the first port 112 to the distribution ports 138 of the multi-service terminal 130. A drop cable 160 may be routed between the subscriber 109 and one of the distribution ports 138.

Figure 8:
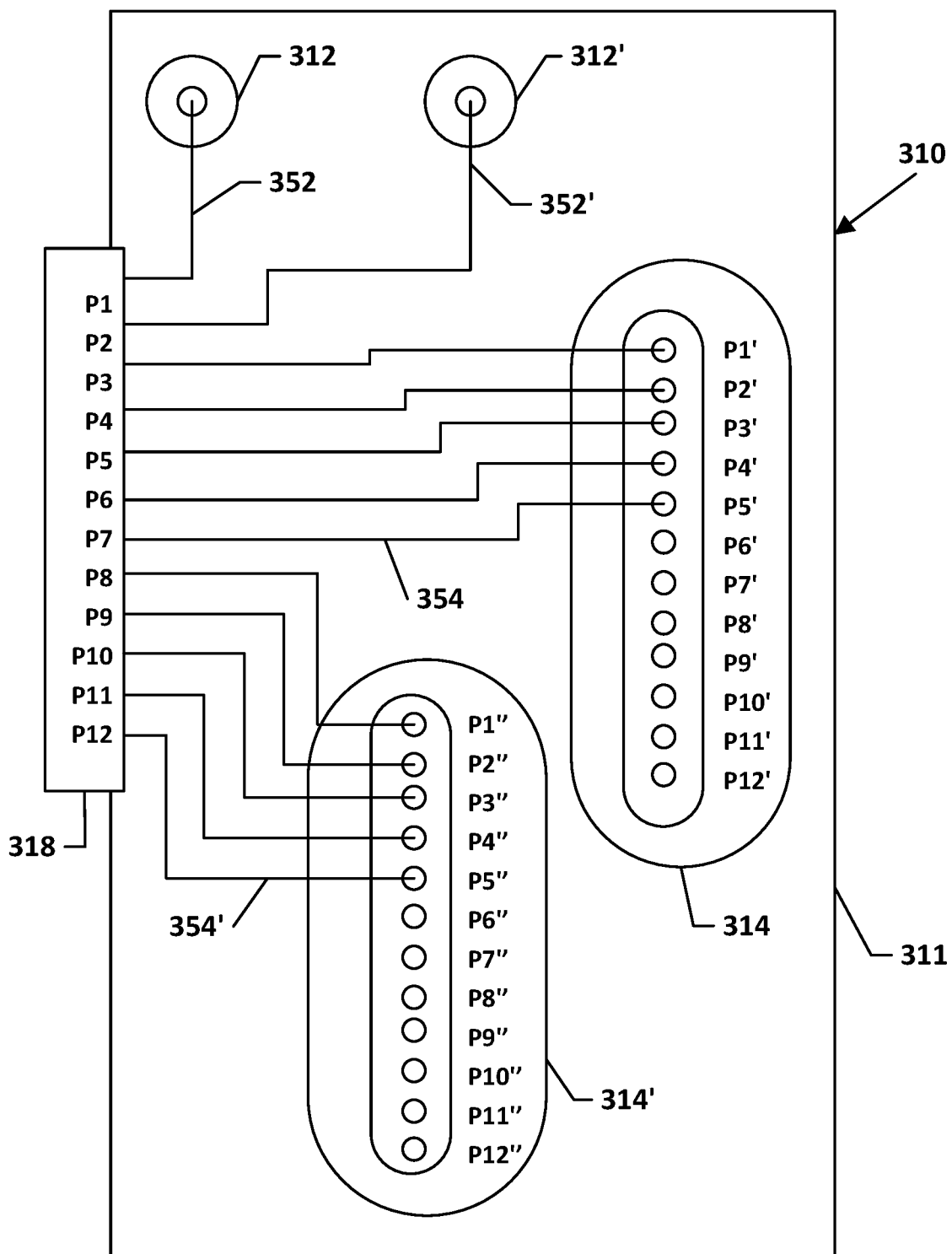
FIG. 8 is a schematic diagram of another example indexing terminal having multiple single-fiber ports and multiple multi-fiber ports.
Figure 9:
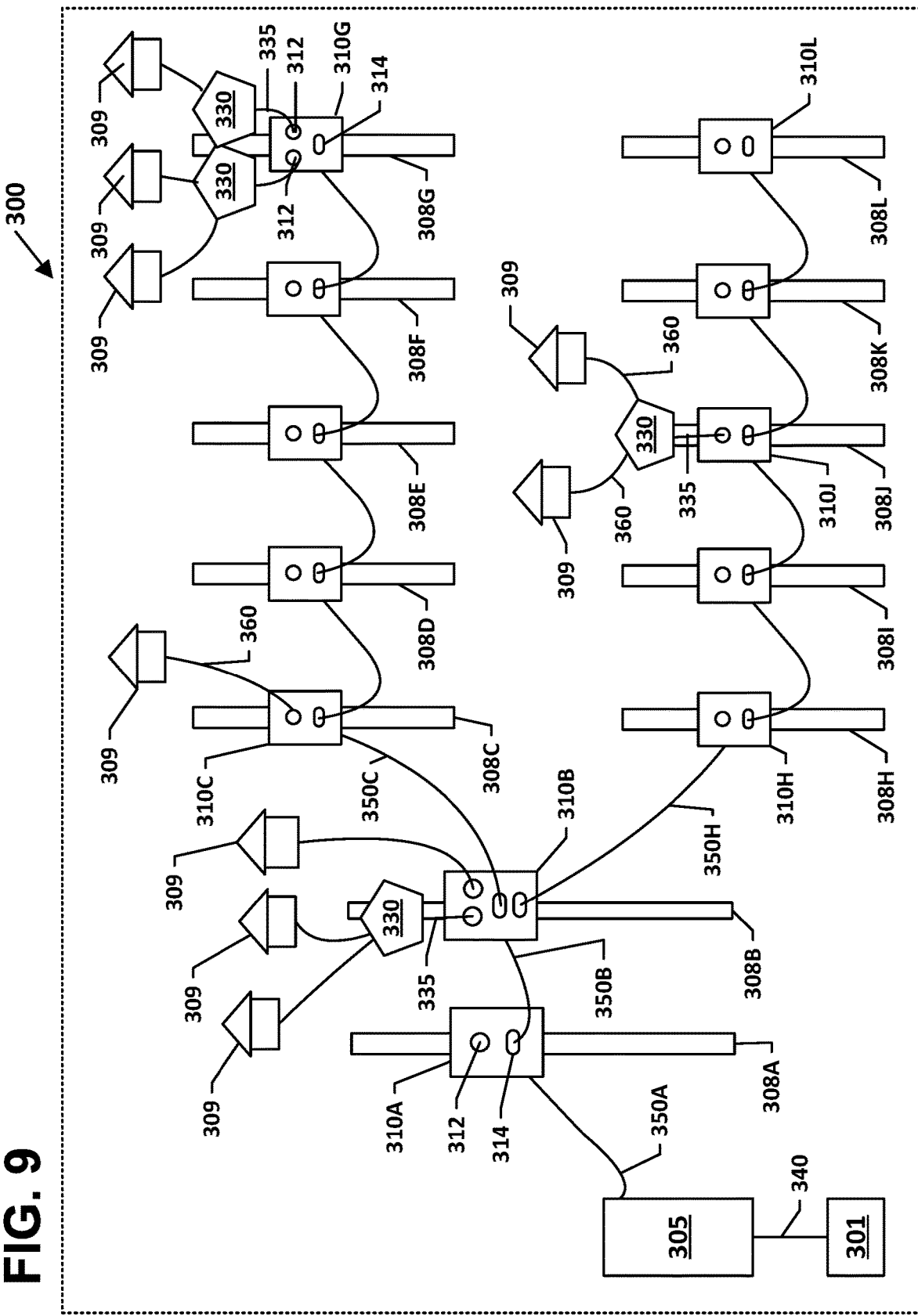
FIG. 9 is a schematic diagram of an example distributed optical network in which any of the indexing terminals disclosed herein may be deployed.

FIG. 8 illustrates another example indexing terminal 310 suitable for use in a distributed optical network 300 of FIG. 9. The indexing terminal 310 includes a housing 311 that defines at least a first single-fiber port 312 and at least a first multi-fiber port 314. In the example shown, the housing 311 defines a first single-fiber port 312, a second single-fiber port 312', a first multi-fiber port 314, and a second multi-fiber port 314'. In other implementations, however, the housing 311 may include a greater number of single-fiber ports and/or multi-fiber ports. In the example shown, the indexing terminal housing 311 also defines an input port 318 (e.g., ruggedized adapter, ruggedized connector, non-ruggedized optical adapter, non-ruggedized optical connector, etc.) configured to receive a multi-fiber distribution cable. In other implementations, however, a stub distribution cable may extend outwardly from the indexing terminal housing 311 as discussed above with respect to the indexing terminal 110 of FIG. 2.

The indexing terminal 310 includes internal cabling between the input port 318 and the other ports 312, 314. The input port 318 arranges optical fibers of the internal cabling into indexed positions. In the example shown, the input port 318 arranges twelve optical fibers into twelve indexed positions P1-P12. In general, each of the single-fiber ports 312 receives one of the optical fibers of the internal cabling for distribution to subscribers 109. In certain implementations, each of the single-fiber ports 312 receives the optical fiber from the next available indexed position of the input port 318. For example, a first optical fiber 352 of the internal cabling extends from the first indexed position P1 at the input port 318 to the first single-fiber port 312 and a second optical fiber 352' extends from the second indexed position P2 at the input port 318 to the second single-fiber port 312'.

The remaining optical fibers of the internal cabling are routed to one or more multi-fiber ports 314 for distribution to additional indexing terminals. In the example shown, the optical fibers 354 extending from the third through seventh indexed positions P3-P7 are routed to the first multi-fiber port 314 and the optical fibers 354' extending from the eight through the twelfth indexed positions P8-P12 are routed to the second multi-fiber port 314'. Each of the multi-fiber ports 314, 314' is configured to receive an optical connector having the same number of optical fibers as the input port 318 and, hence, the same number of indexed positions. In the example shown, the first multi-fiber port 314 has twelve indexed positions P1'-P12' and the second multi-fiber port 314' has twelve indexed positions P1"-P12". In other implementations, the multi-fiber ports 314, 314' and input port 318 may have a greater or lesser number of indexed positions. The optical fibers 354, 354' are indexed at the multi-fiber ports 314, 314' in sequence beginning with the first indexed position P1', P1", respectively. At least one of the indexed positions at each multi-fiber port 314, 314' does not receive an optical fiber 354, 354'. In the example shown, multiple indexed positions at each multi-fiber port 314, 314' do not receive optical fibers 354, 354'.

Such a cabling configuration enables the optical network to branch at one of the indexing terminals 310. For example, FIG. 9 illustrates another example optical network 300 that includes a central office 301, at least one fiber distribution hub 305, and a plurality of indexing terminals. Any of the indexing terminals described herein may be utilized in the optical network 300. For example, a first indexing terminal 310A mounted to a first mounting location 308A in FIG. 9 has the same structural configuration as described above with respect to the indexing terminal 110 of FIG. 2. The first indexing terminal 310A has one single-fiber port 312 and one multi-fiber port 314. A stub cable 350A optically couples the first indexing terminal 310A to the distribution hub 305.

A second indexing terminal 310B is mounted to a mounting structure 308B in FIG. 9. A second distribution cable 350B optically couples the second indexing terminal 310B to the first indexing terminal 310A. The second indexing terminal 310B has two single-fiber ports and two multi-fiber ports (e.g., see indexing terminal 310 of FIG. 8). As shown in FIG. 9, a third distribution cable 350C may optically couple a third indexing terminal 310C to the first multi-fiber port 314 and another distribution cable 350H may optically couple an eighth indexing terminal 310H to the second multi-fiber port 314 of the second indexing terminal 310B. Only the first five optical fibers of each distribution cable 350C, 350H carry optical signals. Accordingly, no more than four indexing terminals may be daisy-chained to each of the third and eight indexing terminals 310C, 310H. Such a branching of optical signals may be advantageous to enable routing of the optical network 300 down adjacent streets.

One or more multi-service terminals 330 may be optically coupled to the indexing terminals 310. For ease in viewing, only four multi-service terminals 330 are shown in FIG. 9. However, it will be understood that each indexing terminal 310 may be coupled to one or more multi-service terminals. In the example shown, one multi-service terminal 330 is shown optically coupled to the first single-fiber port 312 of the second indexing terminal 310B, two multi-service terminals 330 are shown optically coupled to the first and second single-fiber ports 312 of the seventh indexing terminal 310G, and one multi-service terminal 330 is shown optically coupled to the tenth indexing terminal 310J. In some implementations, one or more of the subscribers may be coupled directly to one of the single-fiber ports 312 of the indexing terminals 310 (e.g., see the second single-fiber port 312 of the second indexing terminal 310B).

Figure 10:
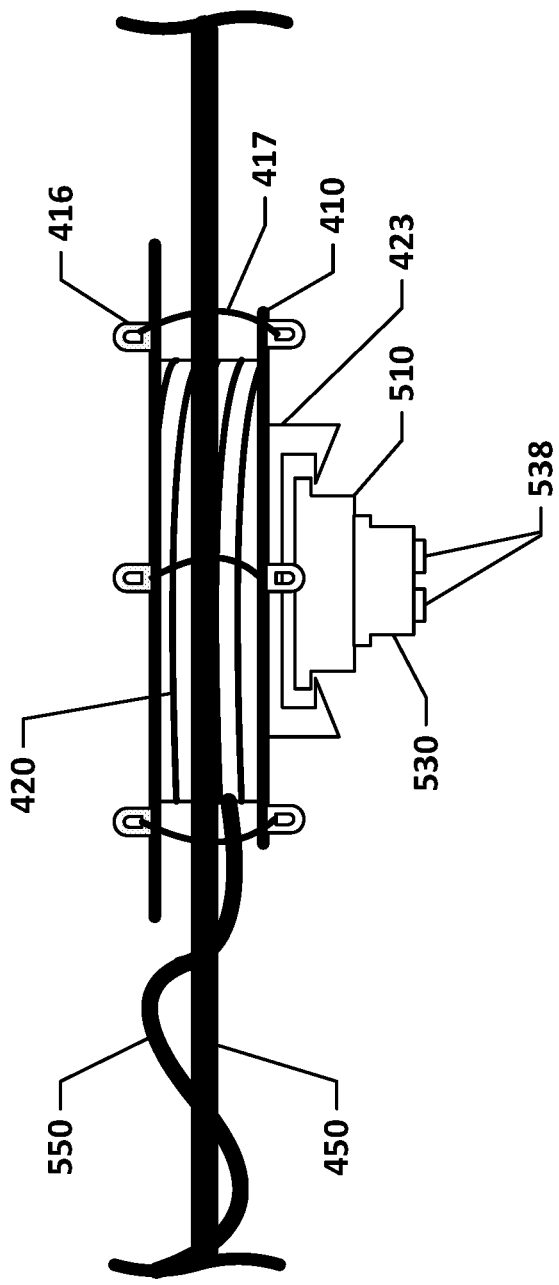
FIG. 10 is a top plan view of another example universal bracket lashed to a strand and holding an example multi-service terminal mounted to an example indexing terminal.

FIG. 10 illustrates another example indexing terminal 510 mounted to another example mounting bracket 410. The mounting bracket 410 is coupled to a slack storage spool 420. In certain implementations, a removable payout spool may be coupled to the mounting bracket 410 and/or stack storage spool 420 prior to deployment. Hooks 416 are coupled to the mounting bracket 410 to facilitate lashing the mounting bracket 410 to a strand 450 extending between mounting structures (e.g., telephone poles). For example, straps, cable ties, or other fastening structures 417 may couple to the hooks 416 and extend around the strand 450. The distribution cable 550 also may be lashed to the strand 450 as the distribution cable 550 extends between the indexing terminal 510 and a previous indexing terminal or distribution hub. In other implementations, the mounting bracket may be secured to the mounting structure itself (e.g., as shown in FIG. 7).

FIG. 10 also illustrates another example multi-service terminal 530 that mounts to the indexing terminal 510. In certain implementations, the multi-service terminal 530 mounts to a housing of the indexing terminal 510 instead of directly to the bracket 410. For example, the multi-service terminal 530 may define a port interface (e.g., a male connector or a female adapter) configured to mate with the port interface (e.g., a corresponding male connector or a corresponding female adapter) of one or more single-fiber ports of the indexing terminal 510. In certain implementations, the port interfaces are ruggedized. In the example shown, the multi-service terminal 530 mounts (e.g., snaps fits, nests, etc.) to a front of the indexing terminal 510 so that the drop ports 538 of the multi-service terminal 530 are freely accessible.

Aspects of the present disclosure relate to systems and methods for deploying a fiber optic network in which a collection of building blocks/components can be integrated to efficiently and cost effectively deploy the fiber optic network in an environment such as a neighborhood or a multi-dwelling unit.

The components can include rapid components. A rapid component is a component that includes a spool about which a fiber optic cable is wrapped. For such components, the cable is deployed by turning the spool about its center axis. During deployment, the spool can be mounted on a spindle/arbor/shaft, supported by a bearing structure, or supported by any other type of structure that allows the spool to rotate as the cable is pulled from the spool.

Figure 11:
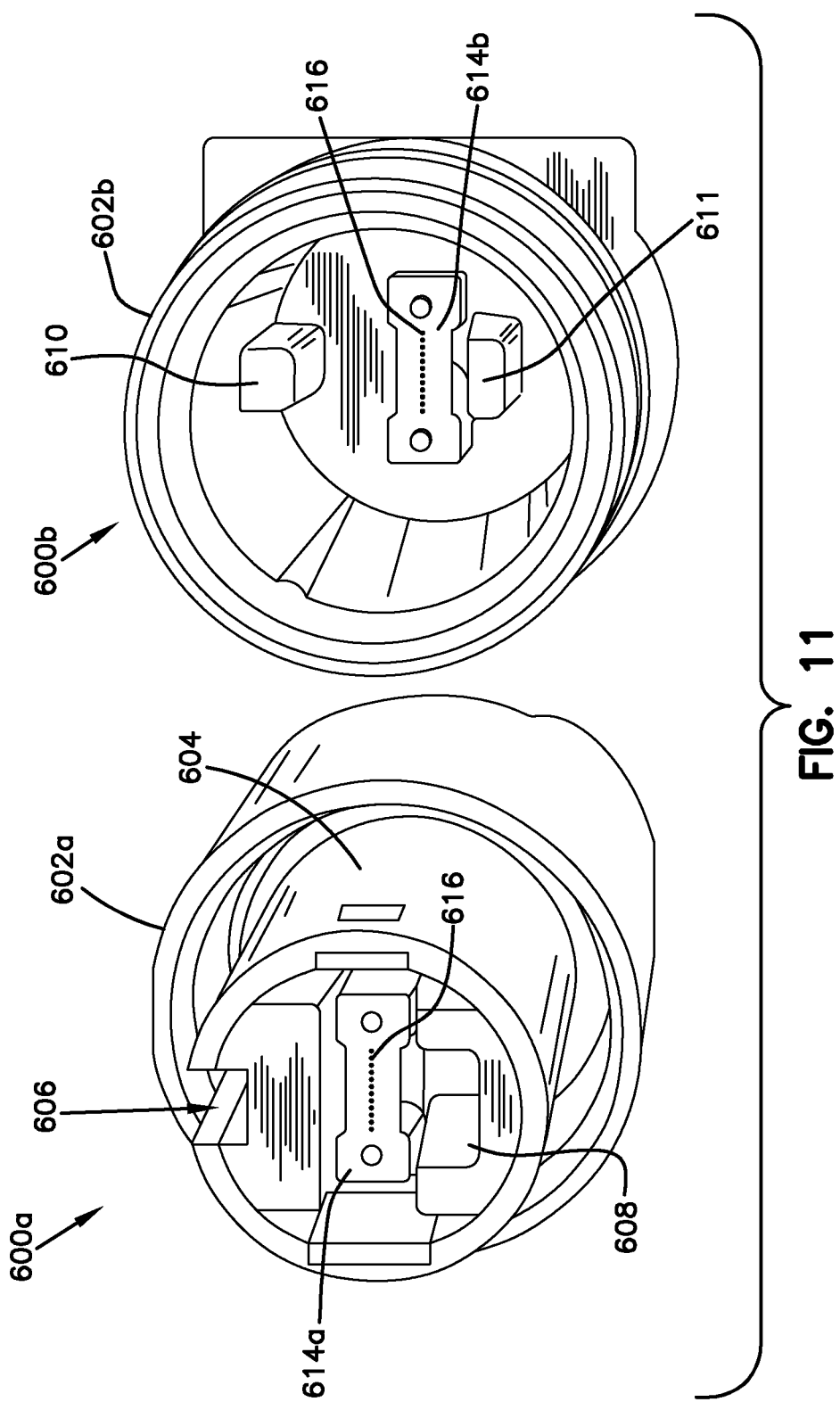
FIG. 11 shows ruggedized multi-fiber connectors that can be used in systems and components of the present disclosure.

The components can include hardened multi-fiber optical connectors (HMFOC). HMFOC's can include environmental seals for sealing the connectors in outside environments. HMFOC's can include fasteners such as threaded fasteners for providing robust connector-to connector mechanical connections. HMFOC's can include male connectors on cables, female connectors on cables, ports/adapters on housings and other structures. HMFOC's can include multi-fiber ferrules including fiber receiving arrangements defining a plurality of fiber receiving positions. In certain examples, the fiber receiving positions can be arranged in one or more rows of fiber receiving positions. FIG. 11 shows example mating male and female HMFOC connectors 600a, 600b. The male and female connectors 600a, 600b include intermatable mechanical coupling interfaces. For example, the male connector 600a includes an internally threaded nut 602a that threads on a threaded portion 602b of the female connector 600b. Also, the male connector 600a includes a plug portion 604 with openings 606, 608 that mate with projections 610, 611 of the female connector 600b to provide alignment during coupling. The connectors 600a, 600b include ferrules 614a, 614b having fiber receiving arrangements that include fiber receiving positions 616 (e.g., a row of twelve fiber receiving positions) that align when the connectors 600a, 600b are mated to provide optical connections between the optical fiber supported by the ferrules 614a, 614b. Further details of example HMFOC connectors are disclosed at U.S. Pat. No. 7,264,402, which is hereby incorporated by reference in its entirety.

The components can also include hardened single fiber connectors (DLX). Hardened single fiber connectors can include environmental seals for sealing the connectors in outside environments. Hardened single fiber connectors can include fasteners such as threaded fasteners for providing robust connector-to connector mechanical connections. Hardened single fiber connectors can include male connectors on cables, female connectors on cables, ports/adapters on housings and other structures. Hardened single fiber connectors can include ferrules supporting single fibers. Further details about example hardened single fiber connectors are disclosed at U.S. Pat. No. 7,959,361, which is hereby incorporated by reference in its entirety.

The components can also include non-ruggedized connectors such as standard single fiber connectors (e.g., SC plugs, SC adapters, LC plugs, LC adapters, ST plugs, ST adapters, etc.) or standard multi-fiber connectors (e.g., MPO plugs and/or MPO adapters).

Figure 12:
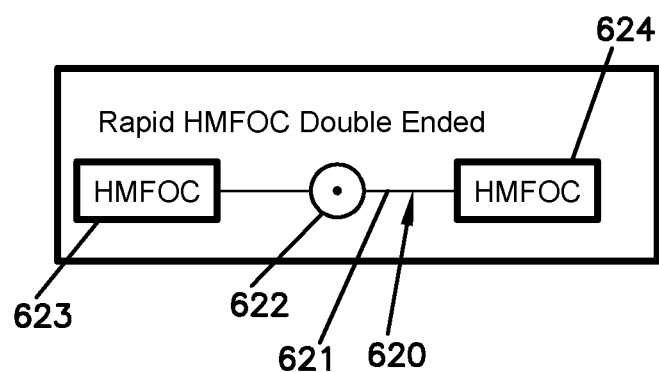
FIG. 12 is a schematic depiction of a multi-fiber cable assembly that can be used in systems in accordance with the principles of the present disclosure.

FIG. 12 shows an example component 620 including a multi-fiber cable 621 spooled on a rapid spool 622. Multi-fiber connectors 623, 624 (e.g., hardened or non-hardened connectors) are mounted at opposite ends of the cable 621.

Figure 13:
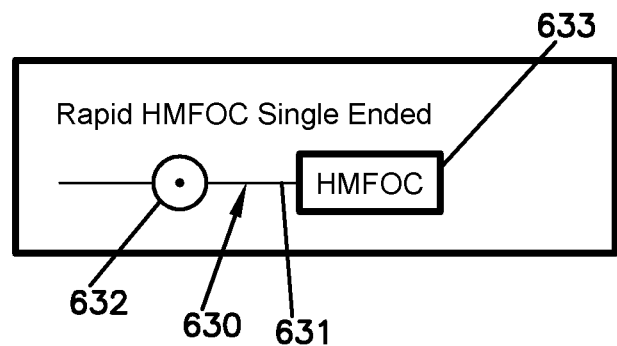
FIG. 13 is a schematic depiction of another multi-fiber cable assembly that can be used in systems in accordance with the principles of the present disclosure.

FIG. 13 shows an example component 630 including a multi-fiber cable 631 spooled on a rapid spool 632. A multi-fiber connector 633 (e.g., hardened or non-hardened connectors) is mounted at one end of the cable 631 and the opposite end of the cable is unconnectorized and therefor ready for splicing.

Figure 14:
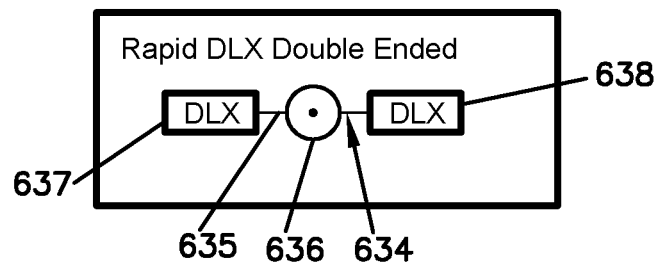
FIG. 14 is a schematic depiction of a single fiber cable assembly that can be used in systems in accordance with the principles of the present disclosure.

FIG. 14 shows an example component 634 including a single-fiber cable 635 spooled on a rapid spool 636. Single-fiber connectors 637, 638 (e.g., hardened or non-hardened connectors) are mounted at opposite ends of the cable 635.

Figure 15:
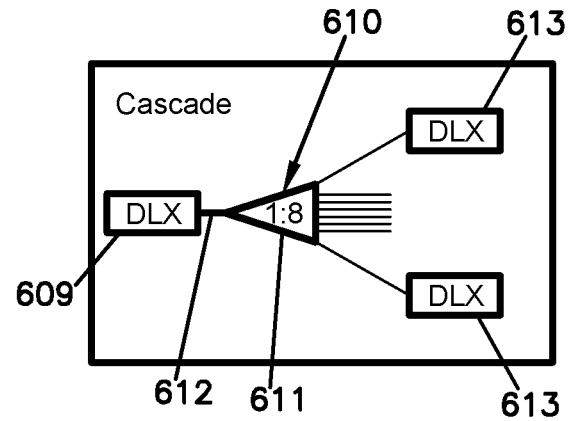
FIG. 15 is a schematic depiction of a passive power splitter assembly that can be used in systems in accordance with the principles of the present disclosure.

FIG. 15 shows an example component in the form of a splitter assembly 610 including a passive optical power splitter 611 having an input optical fiber 612 terminated by a single fiber connector 609 (e.g., a hardened or non-hardened connector) and output optical fibers terminated by single fiber optical connectors 613 (e.g., hardened or non-hardened) so as to form connectorized pigtails/stubs. In other examples, the output optical fibers can be terminated by a multi-fiber connector (e.g., a hardened or non-hardened connector).

Figure 16:
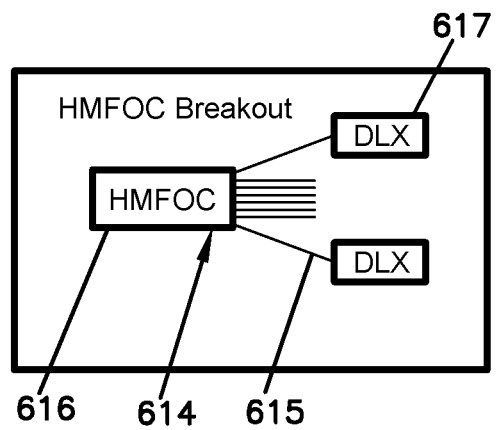
FIG. 16 is a schematic depiction of a fiber break-out assembly that can be used in systems in accordance with the principles of the present disclosure.

FIG. 16 shows an example component in the form of a breakout assembly 614 including a plurality of optical fibers 615 having first ends terminated at a multi-fiber optical connector 616 (e.g., a hardened or non-hardened optical connector) and second ends terminated by single fiber optical connectors 617 (e.g., hardened or non-hardened connectors).

Figure 17:
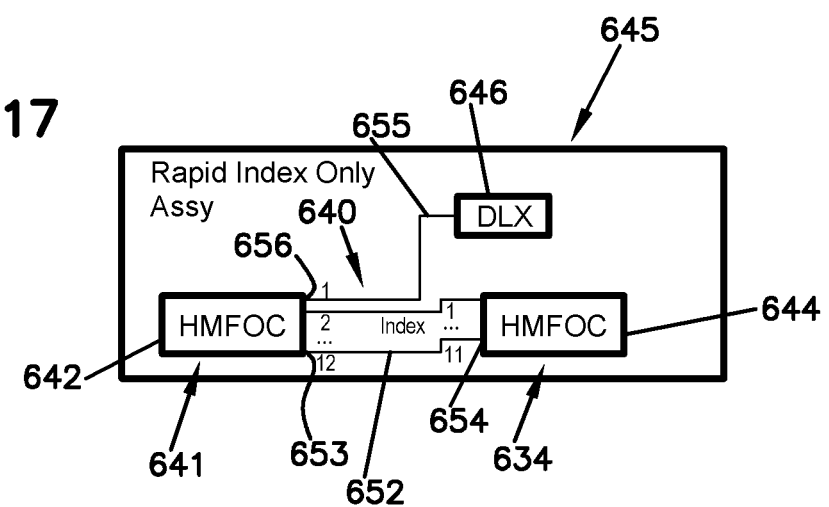
FIG. 17 is a schematic depiction of a fiber indexing and distribution device that can be used in systems in accordance with the principles of the present disclosure.
Figure 19:
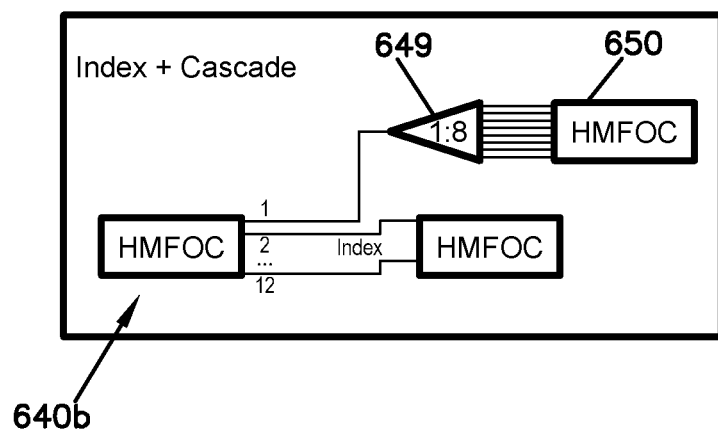
FIG. 19 is a schematic depiction of a further fiber indexing and distribution device that can be used in systems in accordance with the principles of the present disclosure.
Figure 18:
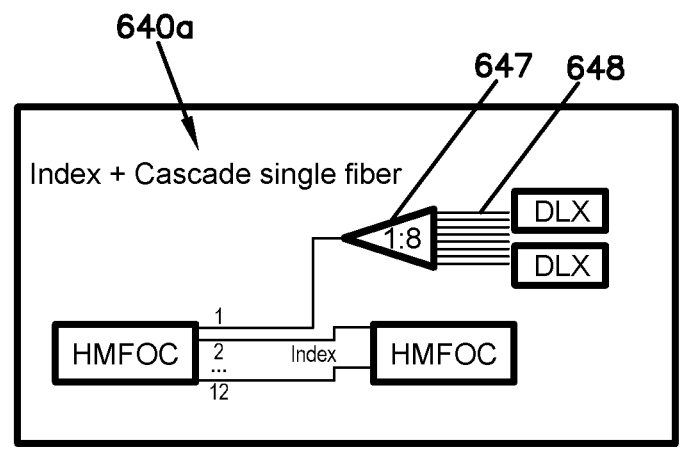
FIG. 18 is a schematic depiction of another fiber indexing and distribution device that can be used in systems in accordance with the principles of the present disclosure.

FIG. 17 shows an example fiber distribution device 640 in accordance with the principles of the present disclosure. The fiber distribution device 640 includes an input location 641 including a first multi-fiber optical connector 642 (e.g., a hardened or non-hardened connector) including a first fiber receiving arrangement that defines a plurality of fiber receiving positions (e.g., a 12 position linear array fiber receiving arrangement as shown at FIG. 11). The fiber distribution device 640 also includes a first output location 643 including a second multi-fiber connector 644 (e.g., a hardened or non-hardened connector) including a second fiber receiving arrangement that defines a plurality of fiber receiving positions (e.g., a 12 position linear array fiber receiving arrangement as shown at FIG. 11). The second fiber receiving arrangement can have the same position configuration as the first fiber receiving arrangement. The fiber distribution device 640 also includes a second output location 645. In the example of FIG. 17, the second output location 645 includes a single fiber optical connector 646 (e.g., a hardened or non-hardened connector). In other examples, the second output location can include a passive optical power splitter 647 having a plurality of separately connectorized output pigtails/cables 648 (see device 640a of FIG. 18) or a passive optical power splitter 649 having a plurality of output fibers terminated by a multi-fiber connector 650 (e.g., a hardened or non-hardened connector) (see device 640b of FIG. 19). The fiber distribution device 640 further includes a plurality of first optical fibers 652 having first and second ends 653, 654. The first ends 653 are secured at the first fiber receiving arrangement of the first multi-fiber connector 642 and the second ends 654 are secured at the second fiber receiving arrangement of the second multi-fiber connector 644. The first and second ends 653, 654 of each of the first optical fibers 652 are secured at different fiber receiving positions of the first and second fiber receiving arrangements. For example, the first ends 653 are secured at positions 2-12 of the first fiber receiving arrangement and the second end 654 are received at positions 1-11 of the second fiber receiving arrangement. Thus, the second ends 654 are each indexed one position over with respect to their corresponding first ends 653. The fiber distribution device 640 further includes at least one second optical fiber 655 having a first end 656 secured at one of the fiber receiving positions (e.g., the first position) of the first fiber receiving arrangement of the first multi-fiber connector 642. The second optical fiber 655 is routed from the first multi-fiber connector 642 to the second output location 645. The second optical fiber 655 is not routed to the second multi-fiber connector 644.

In certain examples, the first and second multi-fiber connectors 642, 644 have configurations that are intermatable. For example, the first multi-fiber connector 642 can include a first mechanical coupling interface having a configuration that is intermatable with a second mechanical coupling interface of the second multi-fiber connector 644. For example, the first multi-fiber connector 642 can include one of the male or female mechanical coupling interfaces of FIG. 11, while the second multi-fiber connector 644 can have the other of the male or female mechanical coupling interfaces of FIG. 11.

In certain examples, the first multi-fiber connector 642, the second multi-fiber connector 644 and the single fiber optical connector 646 can be mounted to or incorporated as part of a terminal housing of the fiber distribution device 640. In such examples, patch cord components (e.g., see FIGS. 13 and 14) can be used to optically couple multiple components together across relatively long distances. In other examples, the fiber distribution device 640 can include one or more stub cables terminated by the connectors 642, 644, 464. In certain examples, the fiber distribution device 640 can be a cable assembly that does not include a rigid housing. In certain examples, the stub cables can be stored on a rapid spool. In certain examples, the fiber distribution device can include a first stub cable terminated by the first multi-fiber connector 642, a second stub cable terminated by the second multi-fiber connector 644, a third stub cable terminated by the connector 646, and a closure that covers the region where the fibers are broken out between the connectors 644, 646. The closure can be flexible in certain examples. In certain examples, the first stub cable can be significantly longer than the second and third stub cables and can be stored on a rapid spool prior to deployment.

Figure 21:
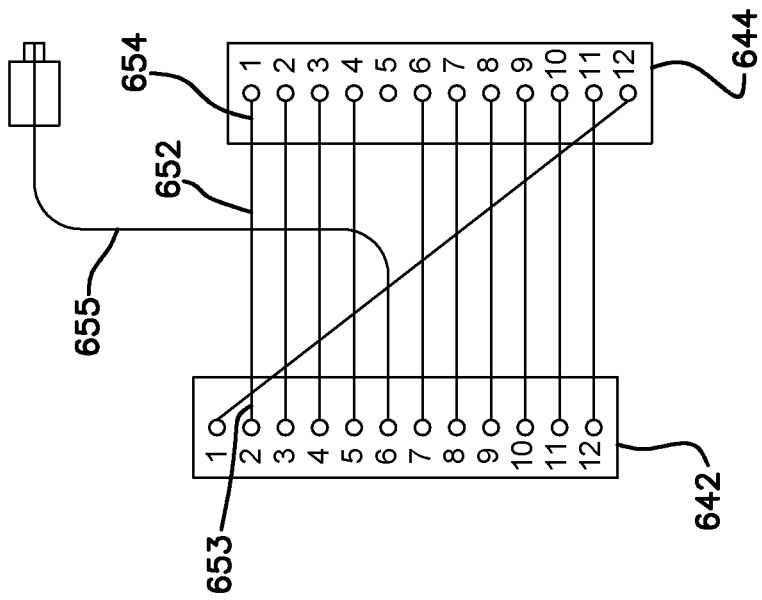
FIG. 21 is a layout of another example fiber indexing scheme that can be used in the devices of FIGS. 17-19 and elsewhere.
Figure 20:
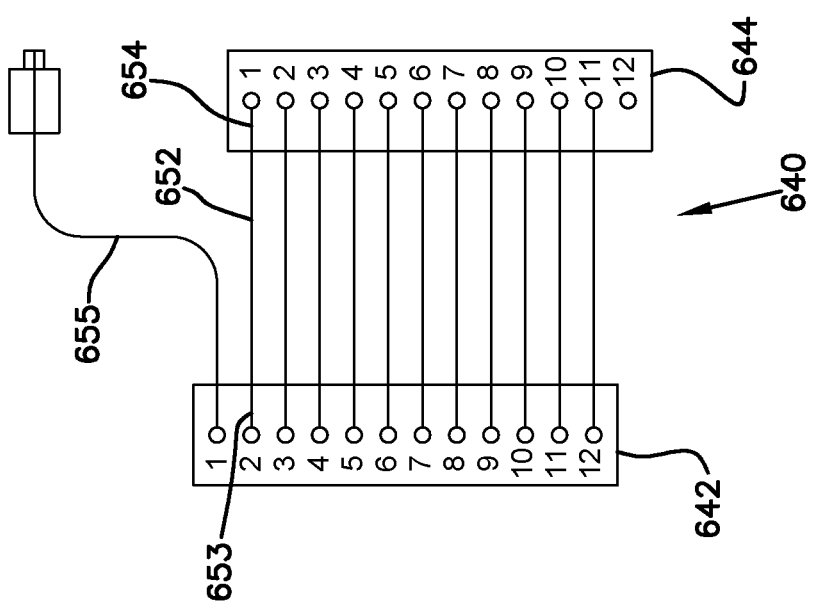
FIG. 20 is a layout of an example fiber indexing scheme that can be used in the devices of FIGS. 17-19 and elsewhere.

FIG. 20 shows an example indexing configuration for the fiber distribution device 640. As depicted, the first and second ends 653, 654 of each of the first optical fibers 652 are secured at different fiber receiving positions of the first and second fiber receiving arrangements corresponding to the first and second multi-fiber connectors 642, 644. For example, the first ends 653 are secured at positions 2-12 of the first multi-fiber connector 642 and the second ends 654 are received at positions 1-11 of the second multi-fiber connector 644. Thus, the second ends 654 are each indexed one position over with respect to their corresponding first ends 653. The second optical fiber 655 is routed from the first position of the first multi-fiber connector 642 to the second output location 645. The second optical fiber 655 can be routed from positions other than the first position. For example, FIG. 21 shows an example where the second optical fiber 655 is routed from the sixth position of the first multi-fiber connector 642 and the fibers 652 corresponding to positions 1-5 and 7-12 of the first multi-fiber connector 642 are routed are routed to the second multi-fiber connector 644. In this example, the second ends 654 of the optical fiber 652 are also indexed one position over with respect to their corresponding first ends 653 at the first multi-fiber connector 642. In other examples, the second ends 654 of the fibers 652 can be indexed more than one position with respect to their corresponding first ends 653.

Figure 22:
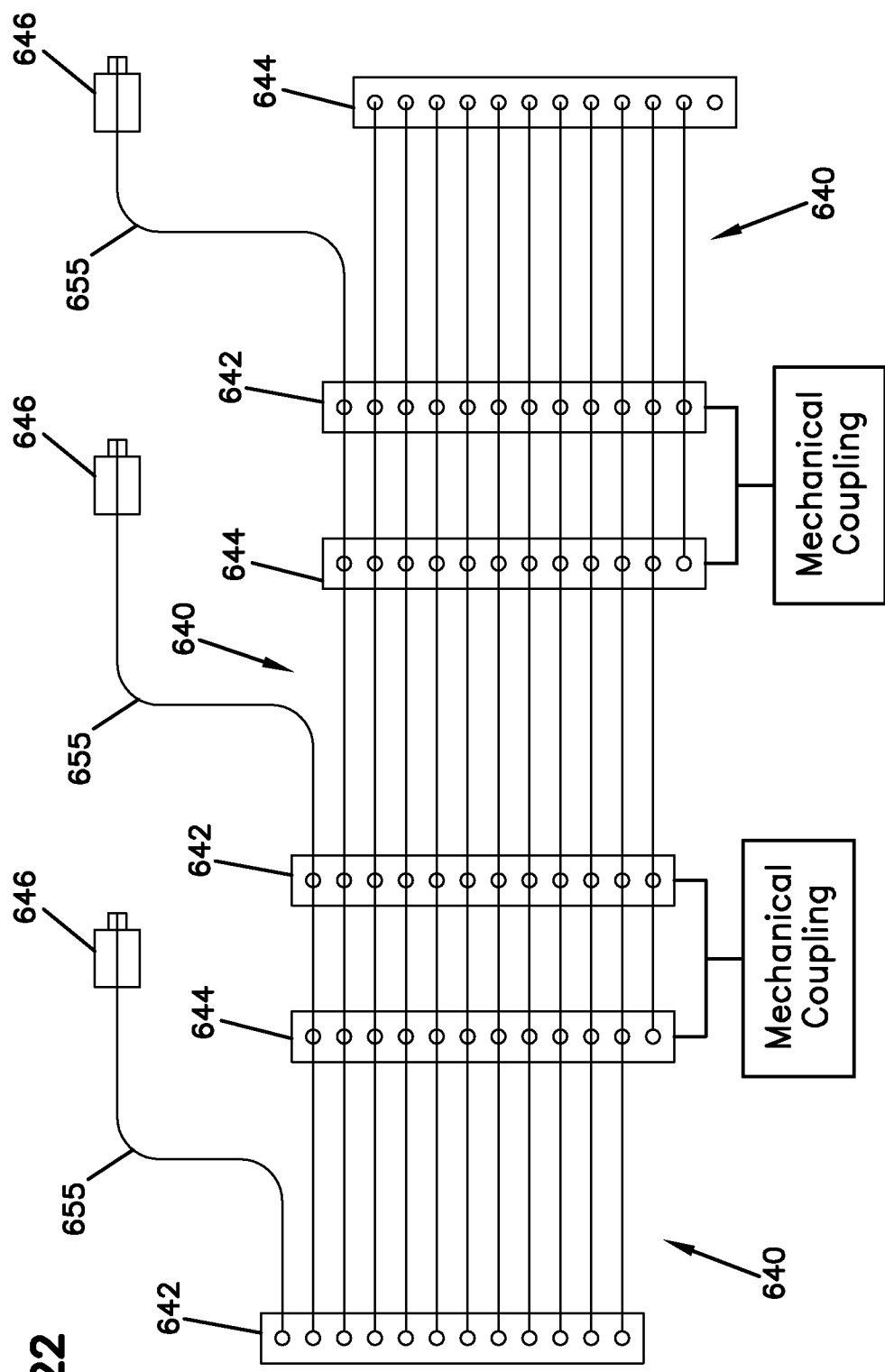
FIG. 22 shows a plurality of the devices of FIG. 20 coupled together to form a fiber distribution line.

FIG. 22 shows several of the fiber distribution devices 640 optically coupled together in a daisy chain configuration. Indexing the fibers 652 between the first and second multi-fiber connectors 642, 644, ensures that a live fiber will be provided at the first port of the first multi-fiber connector 642 (and thus the second output location) when multiple fiber distribution devices are strung together in a chain. Indexing allows the same component to be used repeatedly throughout the deployed system and thereby reduces the need for customization of components. Minimizing the number of types of components used reduces manufacturing and stocking costs and facilitates installation by reducing the likelihood of using the improper component at a given location.

Referring still to FIG. 22, the first multi-fiber optical connector 642 of the first device 640 in the chain has a fiber position arrangement including a plurality of fiber positions at which the first ends 653 of the first optical fibers 652 are located. The second multi-fiber optical connector 654 is configured to couple with a third multi-fiber optical connector (e.g., the first multi-fiber connector 642 of the second device 640 in the chain) having the same fiber position arrangement as the first multi-fiber optical connector 642 of the first device 640 in the chain. The second ends 654 of the first optical fibers are arranged within the second multi-fiber connector 644 such that when the second and third multi-fiber connectors are coupled together, the second ends of the first optical fibers align with fiber positions of the third multi-fiber optical connector that are different from the fiber positions of the first multi-fiber optical connector at which the corresponding first ends of the first optical fibers are located. For example, the positions are indexed one increment. See also FIG. 30 for a further illustration.

Figure 23:
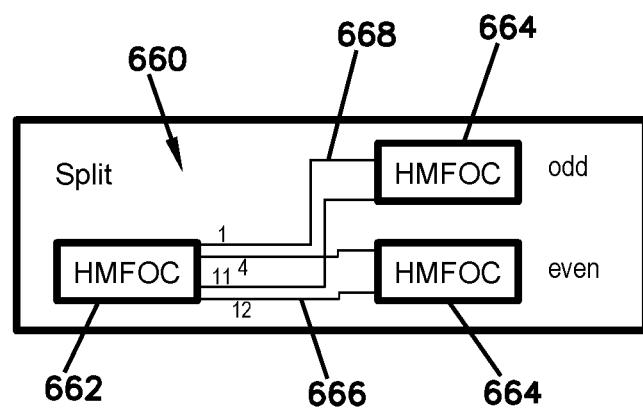
FIG. 23 is a schematic depiction of a bifurcating/dividing device that can be used in systems in accordance with the principles of the present disclosure.

FIG. 23 shows another component 660 having a dividing/bifurcation configuration. In this example, the component includes an input multi-fiber connector 662 (hardened or non-hardened) and two output multi-fiber connectors 664 (hardened or non-hardened). The multi-fiber connectors can include 12 fiber positions. First fibers 666 are routed from the input multi-fiber connector 662 and one of the output multi-fiber connectors 664 and second fibers 668 are routed from the input multi-fiber connector 662 to the other of the output multi-fiber connector 664. The first fibers 666 occupy the even positions of the input multi-fiber connector 662 and the second fibers 668 occupy the odd positions of the input multi-fiber connector 662. The first and second fibers 666, 668 can occupy positions 1-6 of their respective output multi-fiber connectors 664.

Figure 24:
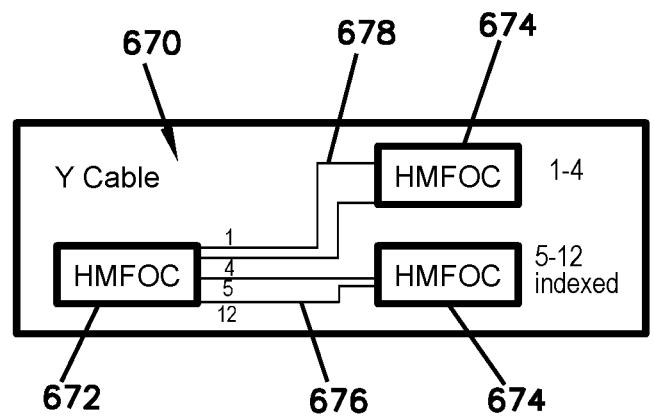
FIG. 24 is a schematic depiction of another bifurcating/dividing device that can be used in systems in accordance with the principles of the present disclosure.

FIG. 24 shows another component 670 having a dividing/bifurcation configuration. In this example, the component includes an input multi-fiber connector 672 (hardened or non-hardened) and two output multi-fiber connectors 674 (hardened or non-hardened). The multi-fiber connectors can include 12 fiber positions. First fibers 676 are routed from the input multi-fiber connector 672 and one of the output multi-fiber connectors 674 and second fibers 678 are routed from the input multi-fiber connector 672 to the other of the output multi-fiber connector 674. The quantity of first fibers 676 is different from the quantity of the second fiber 678. As depicted, the first fibers 676 occupy positions 5-12 of the input multi-fiber connector 662 and the second fibers 678 occupy positions 1-4 of the input multi-fiber connector 662. The first and second fibers 666, 668 can occupy positions 1-4 and 1-8 of their respective output multi-fiber connectors 664.

Figure 25:
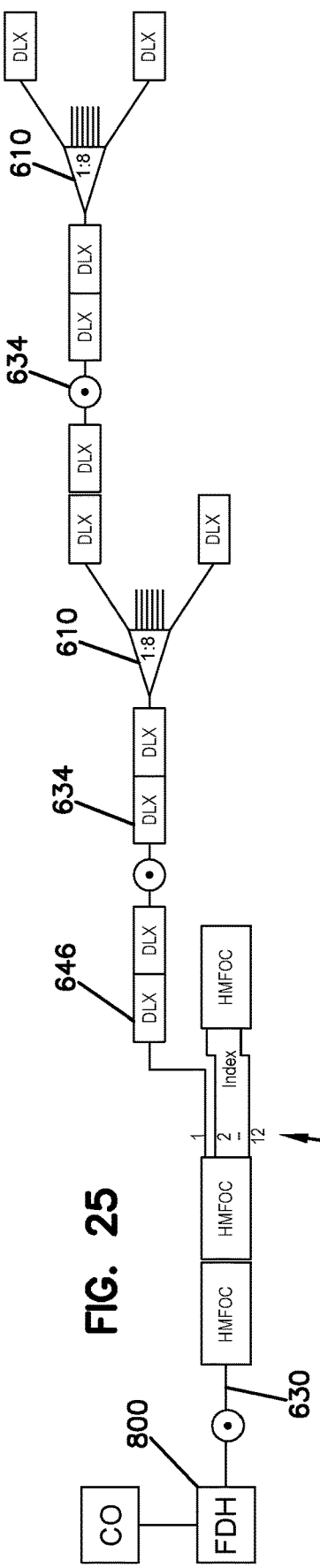
FIG. 25 is a schematic depiction of a distribution scheme that can be used in systems in accordance with the principles of the present disclosure.
Figure 26:
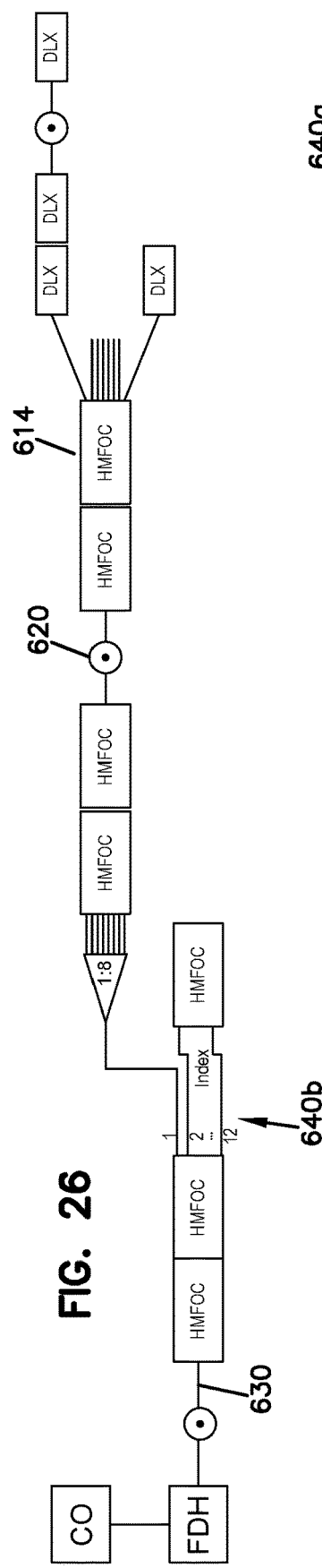
FIG. 26 is a schematic depiction of another distribution scheme that can be used in systems in accordance with the principles of the present disclosure.
Figure 27:
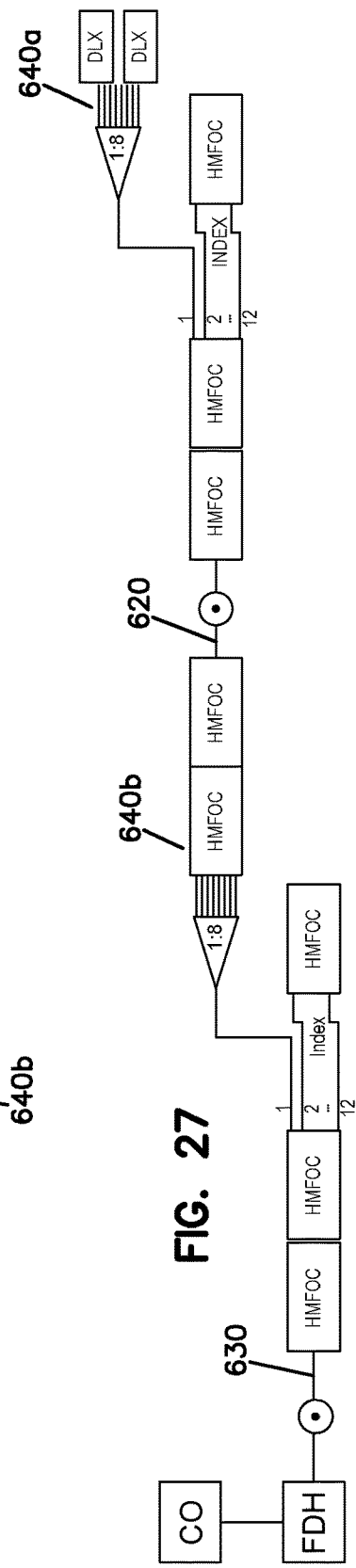
FIG. 27 is a schematic depiction of a further distribution scheme that can be used in systems in accordance with the principles of the present disclosure.

In deploying a system, a fiber distribution hub 800 can initially be installed. The fiber distribution hub can include a re-enterable enclosure containing an optical power splitter that may be optically connected to a central office or other signal source. Outputs of the splitter can be optically coupled to a cable terminated by a multi-fiber connector such as an HMFOC. The cable can be a rapid cable of the type shown by component 630 of FIG. 13. When a customer/subscriber is ready to be added to the network, a distribution device (e.g., device 640, device 640*a* or device 640*b*) can be optically coupled to the component 630. If additional cable length is needed, an intermediate patch cord (e.g., component 620 of FIG. 12) can be installed between the component 630 and the distribution device. If the fiber distribution device 640 is used (see FIG. 25), a splitter device (e.g., splitter component 610 of FIG. 15) can be coupled to the single fiber optical connector 446 to expand the number of lines available for subscribers. A single fiber patch cord (e.g., component 634 of FIG. 14) can be used to provide additional cable length where needed. Multiple splitter devices can be coupled together in a cascading configuration to further expand the number of lines available for customers (see FIG. 25). Distribution devices 640 can also be coupled together (as shown at FIG. 22) to further expand the network. If the fiber distribution device 640*a* is used, single fiber patch cords (e.g., component 634 of FIG. 14) can be used to connect the splitter outputs to subscriber locations. Additionally, splitter components 610 can be added downstream in a cascade configuration to expand the network capacity. If the fiber distribution device 640*b* is used, a breakout device (e.g., see component 614 of FIG. 16) can be used to distribute the splitter outputs to individual subscribers (see FIG. 26). Component 620 can be used to provide additional cable length between the device 640*b* and the component 614. In certain examples, the fiber distribution device 640*a* can be coupled to the second output location of the fiber distribution device 640*b* to provide a cascaded splitter arrangement with additional distribution possible through the first output location of the device 640*a* (see FIG. 27). The components 660, 670 can be used to divide a given network line into multiple branches.

Figure 28:
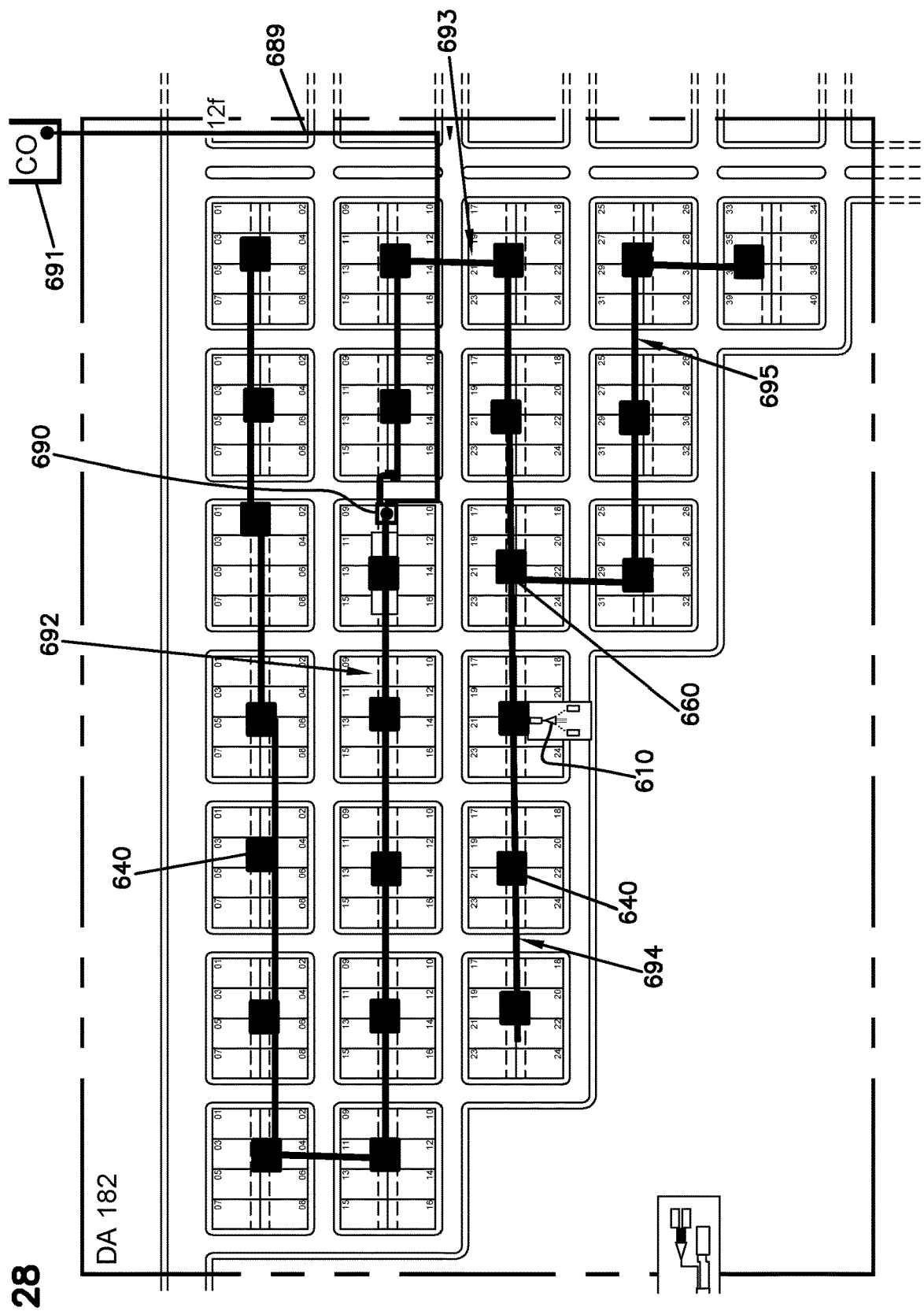
FIG. 28 is a schematic depiction of a passive outdoor network distribution scheme that can be used in systems in accordance with the principles of the present disclosure.

FIG. 28 shows multiple fiber distribution devices 640 positioned along a passive outdoor network routed from a fiber distribution hub 690. The components of the system can use hardened connectors. A feed cable 689 optically connects the fiber distribution hub 690 to a central office 691. The network includes first and second distribution lines 692, 693 that extend outwardly from the hub 690. The distribution lines 692, 693 can each be 12 fiber lines. The fiber distribution line 692 includes devices 640 coupled together with the daisy chain and fiber indexing technique of FIG. 22. Each device 640 is positioned to service a block of the neighborhood. Splitter components 610 can be coupled to the second outputs of the devices 640 to provide individual lines for each potential customer in the block. The distribution line 693 has a similar configuration to the distribution line 692, except one the divider components 660 has been used to divide the line 693 into separate branches 694, 695. Through indexing, live signals can be provided to all twelve devices 640 of each line 692, 693.

Figure 29:
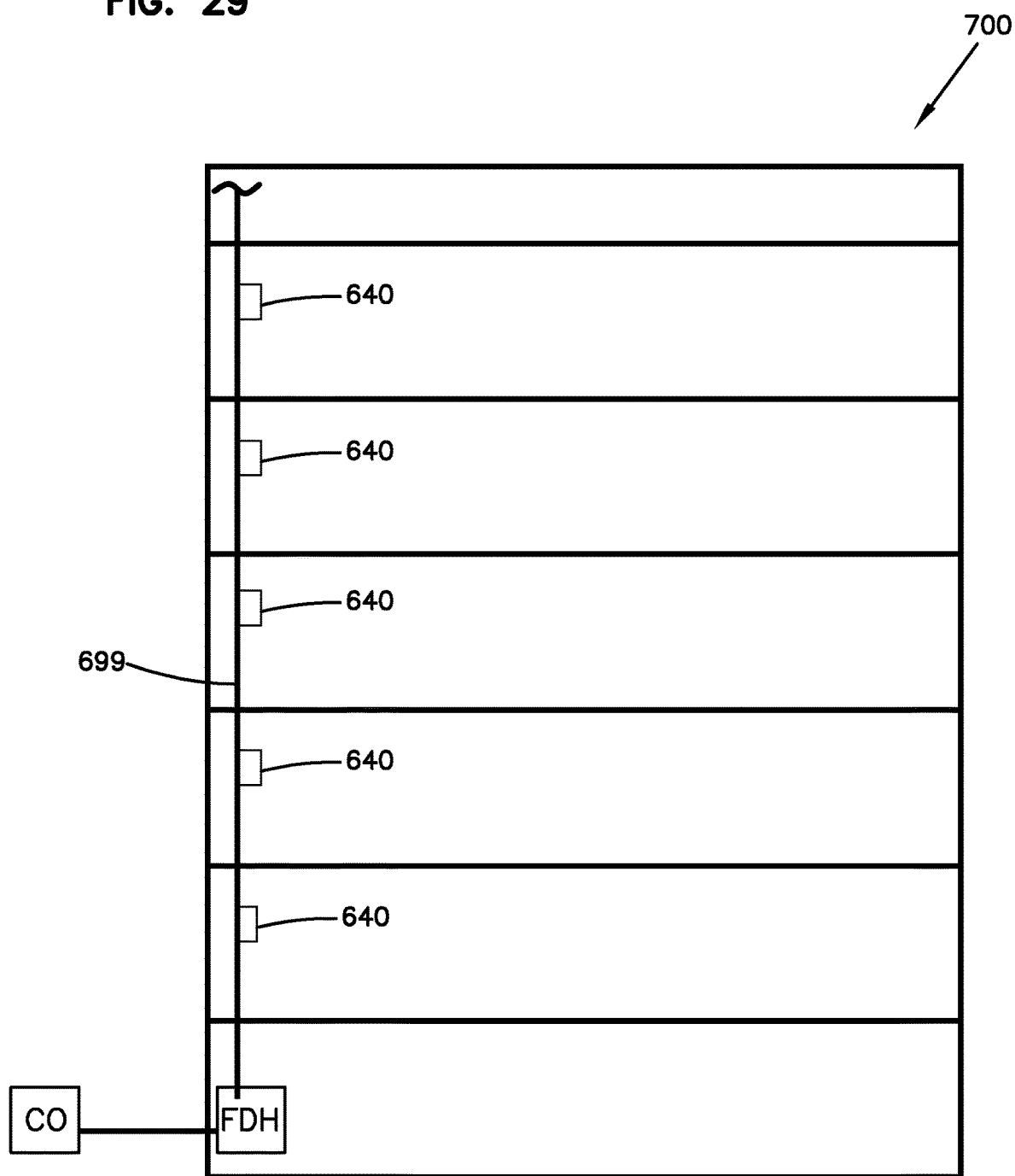
FIG. 29 is a schematic depiction of a multi-dwelling unit distribution scheme that can be used in systems in accordance with the principles of the present disclosure.

FIG. 29 shows a distribution line 699 in a multi-dwelling unit 700. The components of the line 699 can use non-hardened connectors. The line 699 includes devices 640 coupled together with the daisy chain and fiber indexing technique of FIG. 22. As depicted, one device 640 can be provided per floor. Splitter components 610 can be coupled to the second outputs of the devices 640 to provide individual lines for each potential customer on the floor. In one example, the line 699 can connect to an FDH in the basement of the building.

Figure 30:
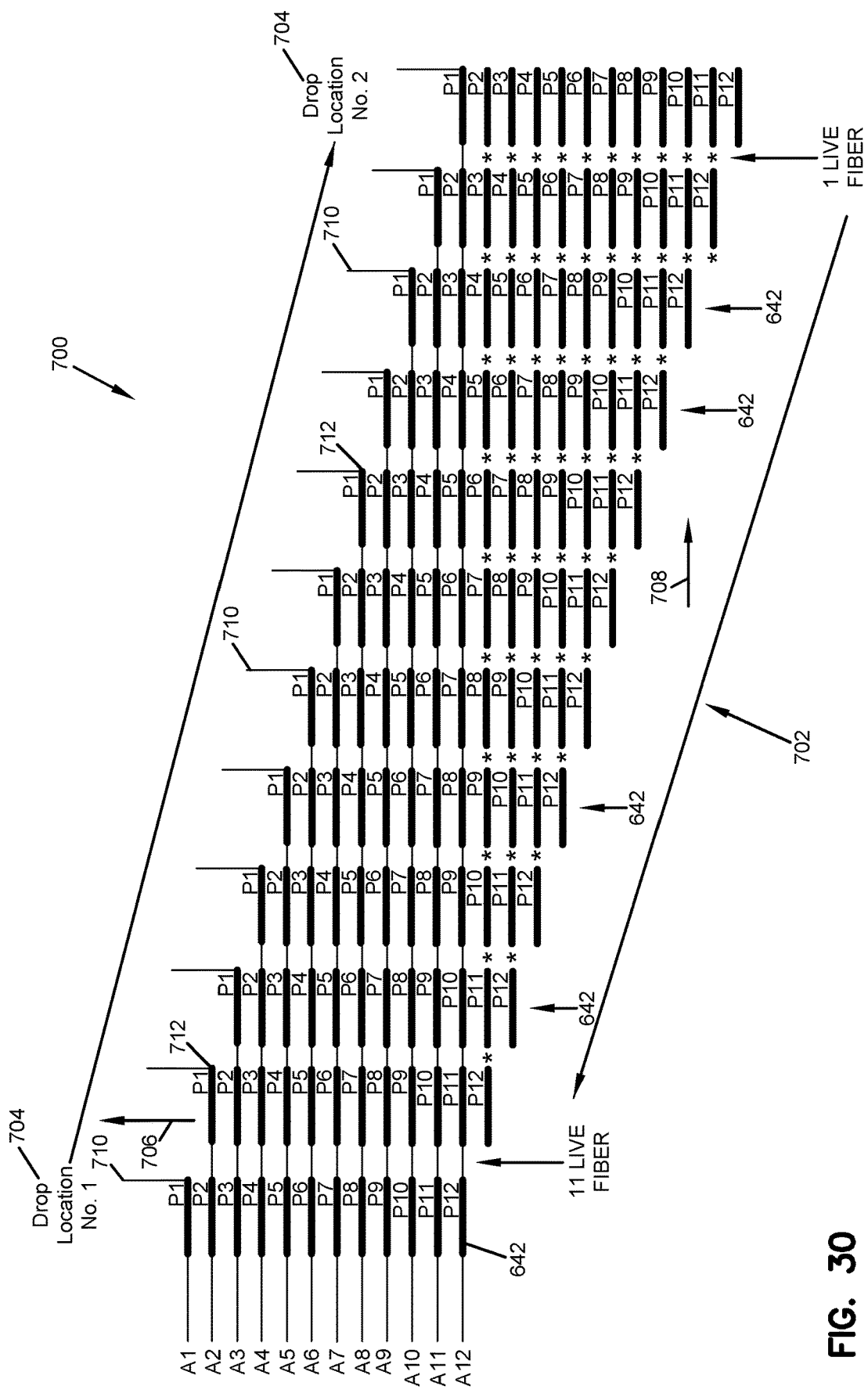
FIG. 30 shows in schematic form another view of the fiber distribution line of FIG. 22.

The system of FIGS. 22 and 30 uses indexing of fibers to ensure that a live fiber will be provided at the first port of the first multi-fiber connector 642 (and thus the second output location) when multi-fiber distribution devices are strung together in a chain. After each indexing step, an additional fiber 657 is no longer used since it is not connected to service through the first connector 642. Fibers 657 in this instance would be dead fibers.

Figure 31:
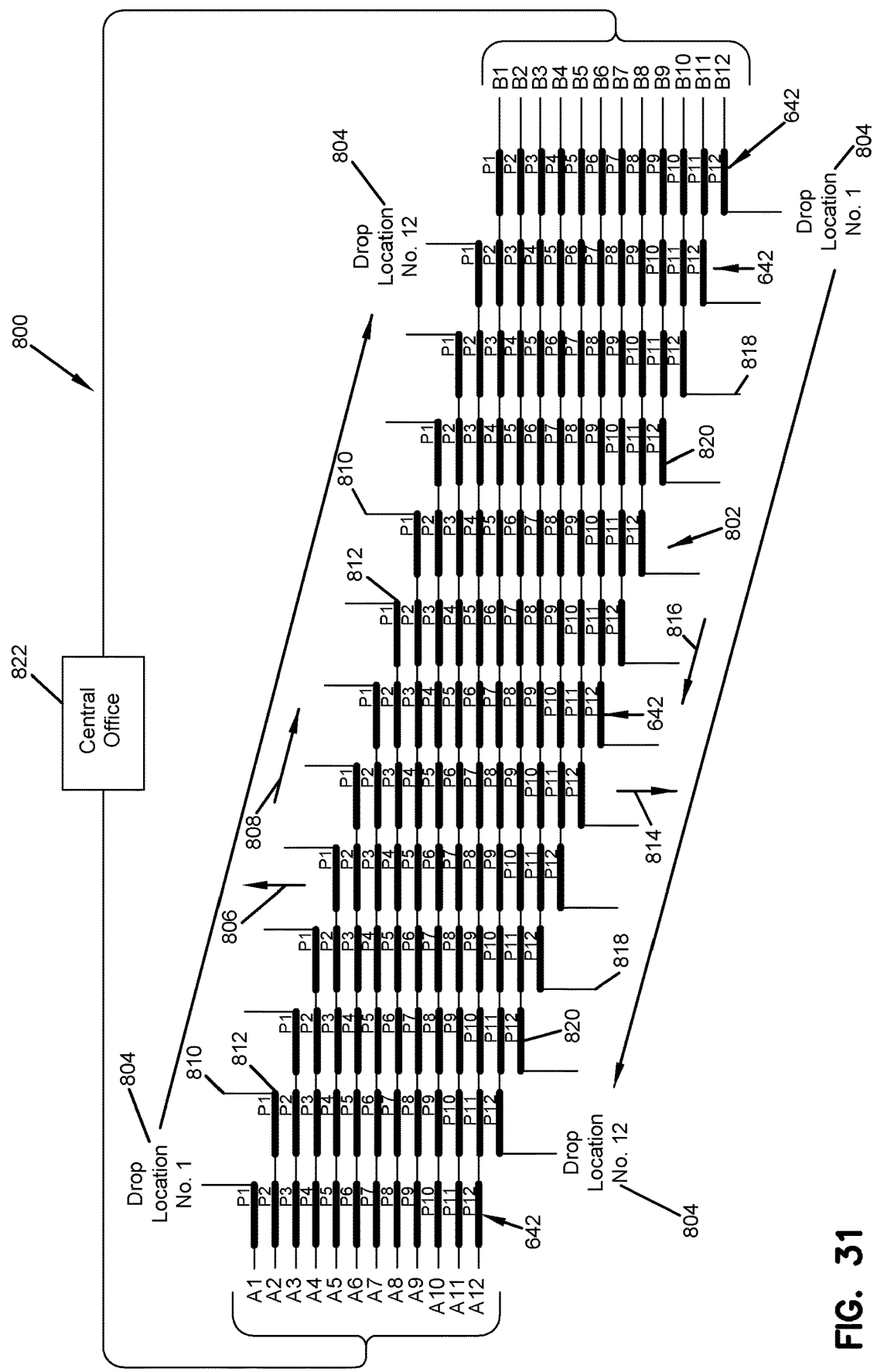
FIG. 31 shows in schematic form a modified fiber distribution line where signal travel is bi-directional.
Figure 32:
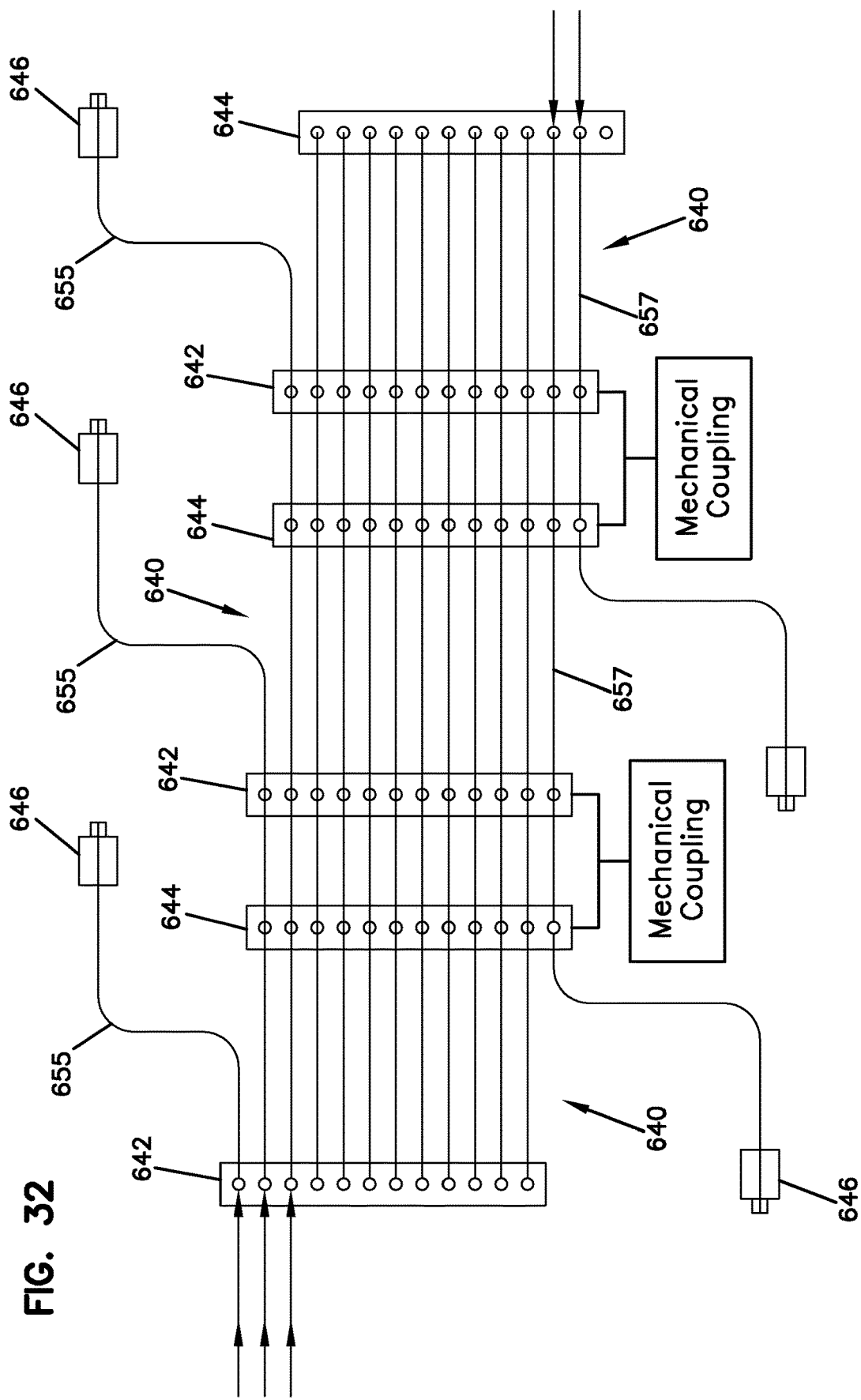
FIG. 32 is a view like FIG. 22 showing use of the bi-directional signal pathway.

The dead fibers 657 can be used to carry signals as live fibers as shown in FIGS. 31 and 32. These signals are carried from right to left as viewed in these FIGS. This implementation can double the capacity of the system by having signals traveling in one direction as they are indexed up in the multi-fiber connectors, and a second set of signals in the opposite direction as the fibers are indexed into the multi-fiber connectors as new fibers. This is shown in FIGS. 31 and 32.

The above bi-directional usage is advantageous in a fiber loop or fiber ring. Another advantage could arise as a redundant fiber path that could serve the drop locations that are downstream from a cable cut. The system of FIGS. 31 and 32 removes the dead fibers and provides options for using them as live fibers with the bi-directional usage. The number can vary as the number of fibers in the multi-fiber connector varies.

As indicated above, FIG. 30 schematically depicts a fiber optic network architecture 700 having features in accordance with the principles of the present disclosure. The fiber optic network architecture 700 includes a plurality of fiber optic lines A1-A12 routed at least partially along a route 702 that extends past a plurality of drop locations 704. As shown at FIG. 30, the solid lines represent live fibers. In contrast, the asterisks represent dead (e.g., unused or dark) fibers.

Multi-fiber optical connectors 642 are positioned along the route 702. The fiber optic lines A1-A12 extend through the multi-fiber optical connectors 642. The multi-fiber optical connectors 642 each have multiple consecutive fiber positions P1-P12 for receiving optical fibers corresponding to the fiber optic lines A1-A12. The fiber optic lines A1-A12 are indexed in a first indexing direction 706 along the consecutive fiber positions P1-P12 of the multi-fiber optical connectors 642 as the fiber optic lines A1-A12 extend in a first route direction 708 along the route 702. The fiber optic lines A1-A12 are progressively dropped from the route 702 to subscriber connection points 710 at the drop locations 704 by indexing the fiber optic lines A1-A12 to one of the consecutive fiber positions P1-P12 that is a first predetermined drop position 712 (e.g., P1).

It will be appreciated that the fiber optic network architecture 700 can include additional multi-fiber connectors incorporated between the depicted connectors and can use multi-fiber connectors having fiber counts other than 12. For example, in certain examples, multi-fiber optical connectors can include at least 4, 6, 8, 10, 12, 24 or more optical fibers. Additionally, in certain examples, the architecture 700 can include any of the indexing components disclosed herein such as indexing terminals, indexing cables, or other types of structures that can be strung together in a chain to provide for progressive (e.g., serial, consecutive, sequential) indexing of the optical fibers toward a predetermined drop position.

FIG. 31 illustrates another fiber optic network architecture 800 in accordance with the principles of the present disclosure. The fiber optic network architecture 800 is configured to utilize the dark fibers of the architecture 700 of FIG. 30 for the purpose of filling the capacity of the network and/or for providing redundant lines to given drop locations.

Referring to FIG. 31, the fiber optic network architecture 800 includes first fiber optic lines A1-A12 and second fiber optic lines B1-B12 routed at least partially along a route 802 that extends past a plurality of drop locations 804. The fiber optic network architecture 800 also includes a plurality of multi-fiber optical connectors 642 positioned along the route 802. The fiber optic lines A1-A12 and B1-B12 extend through the multi-fiber optical connectors 642. The multi-fiber optical connectors 642 each have a plurality of consecutive fiber positions P1-P12 for receiving optical fibers corresponding to the fiber optic lines A1-A12 and B1-B12.

The fiber optic lines A1-A12 are indexed in a first indexing direction 806 along the consecutive fiber positions P1-P12 of the multi-fiber optical connectors 642 as the fiber optic lines A1-A12 extend in a first route direction 808 along the route 802. The fiber optic lines A1-A12 are progressively dropped from the route 802 to subscriber connection points 810 at the drop locations 804 by progressively indexing the fiber optic lines A1-A12 to one of the consecutive fiber positions P1-P12 that is a first predetermined drop position 812 (e.g., P1).

The fiber optic lines B1-B12 are indexed in a second indexing direction 814 along the consecutive fiber positions P1-P12 as the fiber optic lines B1-B12 extend in a second route direction 816 along the route 702. The optical fiber lines B1-B12 are progressively dropped from the route 802 to subscriber connection points 818 at the drop locations 804 by progressively indexing the fiber optic lines to another of the consecutive fiber positions P1-P12 that is a second predetermined drop position 820 (e.g., P12). The second predetermined drop position 820 is a different one of the consecutive fiber positions P1-P12 as compared to the first predetermined drop position 812. Also, the first indexing direction 806 is opposite from the second indexing direction 814. Moreover, the first route direction 808 is opposite from the second route direction 816.

It will be appreciated that the architecture 800 is depicted schematically and that additional multi-fiber optical connectors can be added into the architecture. Additionally, single fiber optical ports such as ruggedized fiber optic adapters can be provided at the subscriber connection points 810, 816. Moreover, various indexing structures can be strung serially together in a chain to form the architecture 800. Example indexing structures include indexing cables, indexing terminals or other structures disclosed herein suitable for providing a fiber indexing function.

In the depicted embodiment, the multi-fiber optical connectors 642 are 12-fiber optical connectors. In other examples, the multi-fiber optical connectors can include at least 4, 6, 8, 12, 24 or more optical fibers.

Referring back to FIG. 31, the first optical lines A1-A12 and the second optical lines B1-B12 extend to a common location such as a central office 822. In this way, the optical fiber lines A1-A12 and the optical fiber lines B1-B12 cooperate to form a fiber loop.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A component comprising:
   a first hardened multi-fiber connection location, the first hardened multi-fiber connection location having a number of fiber positions defined by a first multi-fiber ferrule;
   a second hardened multi-fiber connection location, the second hardened multi-fiber connection location having a second multi-fiber ferrule defining the same number of fiber positions as the first multi-fiber ferrule of the first hardened multi-fiber connection location;
   first fibers indexed between the first and second multi-fiber connection locations;
   a splitter having an input and a plurality of outputs, wherein the plurality of outputs includes eight outputs that all terminate, at a third hardened multi-fiber connection location, the third multi-fiber connection location including a third multi-fiber ferrule defining fiber positions that receive the outputs of the splitter; and
   a second fiber routed from the first hardened multi-fiber connection location to the input of the splitter.

2. The component of claim 1, wherein the first fibers are bidirectionally indexed.

3. The component of claim 1, wherein the first and second hardened multi-fiber connection locations define twelve fiber positions.

4. The component of claim 1, wherein configurations of the first and second hardened multi-fiber connection locations are intermateable.

5. The component of claim 1, further comprising a housing carrying the first and second hardened multi-fiber connection locations.

6. The component of claim 5, wherein the housing carries the splitter and the third hardened multi-fiber connection location.

7. The component of claim 1, wherein each of the first, second, and third hardened multi-fiber connection locations includes a multi-fiber optical adapter, the multi-fiber optical adapter at the third hardened multi-fiber connection location receiving the third multi-fiber ferrule.

8. The component of claim 1, wherein each of the first and second hardened multi-fiber connection locations includes a multi-fiber optical connector.

9. The component of claim 1, wherein the component includes a bifurcated cable.

10. A system comprising:
   a first indexing chain having a plurality of indexing components, each indexing component having respective first and second multi-fiber connection locations that are each defined by a respective multi-fiber ferrule, each indexing component including a plurality of indexing fibers indexed between the multi-fiber ferrules of the respective first and second multi-fiber connection locations, wherein the multi-fiber ferrule of the first multi-fiber connection location of each indexing component is intermateable to the multi-fiber ferrule of the second multi-fiber connection location of each other indexing component, wherein the indexing components are daisy-chained together by interconnecting the first and second multi-fiber connection locations;
   a splitter having an input, the splitter being configured to split optical signals from the input onto a plurality of output fibers terminated at a third multi-fiber connection location, the third multi-fiber connection location including a hardened multi-fiber optical connector including a respective multi-fiber ferrule;
   a drop fiber connected to the first multi-fiber connection location of one of the indexing components and connected to the input of the splitter; and
   a second indexing chain extending from the third multi-fiber connection location, the second indexing chain having a plurality of indexing components, each indexing component of the second indexing chain having respective first and second multi-fiber connection locations, each indexing component of the second indexing chain including a plurality of indexing fibers indexed between the respective first and second multi-fiber connection locations.

11. The system of claim 10, wherein the first multi-fiber connection location of each indexing component of the second indexing chain is intermateable to the second multi-fiber connection location of each other indexing component of the second indexing chain, wherein the indexing components of the second indexing chain are daisy-chained together by interconnecting the first and second multi-fiber connection locations.

12. The system of claim 10, wherein each of the first, second, and third hardened multi-fiber connection locations includes a multi-fiber optical adapter, the multi-fiber optical adapter at the third hardened multi-fiber connection location receiving the third multi-fiber optical connector.

13. The system of claim 10, wherein each of the first and second hardened multi-fiber connection locations includes a multi-fiber optical connector.

\* \* \* \* \*